United States Patent
Saitoh et al.

(10) Patent No.: US 6,618,343 B1
(45) Date of Patent: Sep. 9, 2003

(54) OPTICAL INFORMATION PROCESSOR AND OPTICAL ELEMENT

(75) Inventors: Youichi Saitoh, Hirakata (JP); Junichi Asada, Kobe (JP); Yuichi Takahashi, Neyagawa (JP); Seiji Nishiwaki, Osaka (JP); Kenji Nagashima, Suita (JP); Kazuo Momoo, Hirakata (JP); Junji Nagaoka, Takatsuki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/436,847

(22) Filed: Nov. 9, 1999

(30) Foreign Application Priority Data

Nov. 9, 1998 (JP) .......................................... 10-317394
Feb. 24, 1999 (JP) .......................................... 11-045748
Jun. 28, 1999 (JP) .......................................... 11-181667

(51) Int. Cl.$^7$ ................................................. G11B 7/00
(52) U.S. Cl. .............................. 369/112.01; 369/112.08; 369/112.23; 369/112.02
(58) Field of Search ........................ 369/112.01, 112.02, 369/44.23, 44.24, 109, 112.08, 112.13, 112.23, 112.15, 112.22

(56) References Cited

U.S. PATENT DOCUMENTS 5,629,799 A    5/1997  Maruyama et al.
5,844,879 A *  12/1998 Morita et al. .......... 369/112.01
5,920,537 A *  7/1999  Komma et al. ......... 369/112.01
6,275,461 B1 * 8/2001  Yoo et al. ............... 369/112.01

* cited by examiner

Primary Examiner—Nabil Hindi
(74) Attorney, Agent, or Firm—Rosenthal & Osha L.L.P.

(57) ABSTRACT

An optical disk device has an aperture of an objective lens in an incoming path of a beam from a semiconductor laser to an optical disk formed larger than an aperture in a return path from the optical disk or an aperture is varied in recording and in reproduction. This configuration improves recording/reproducing ability since light is focused on an optical disk with high numerical aperture. In addition, since reflected light from the optical disk is detected with low numerical aperture, margins for tilt and defocus are not reduced. Furthermore, since unnecessary signal components contained in the reflected light can be eliminated, a S/N (signal-to-noise ratio) of an information signal also increases. Thus, a high-performance optical disk device can be obtained. Alternatively, by varying the aperture of an objective lens in recording and in reproduction, an optical disk device in which recording density and recording quality are increased without deteriorating reproduction quality can be obtained.

9 Claims, 20 Drawing Sheets

US 6,618,343 B1

OPTICAL INFORMATION PROCESSOR AND OPTICAL ELEMENT

FIELD OF THE INVENTION

The present invention relates to an optical information processor in which information is optically recorded on or reproduced from an optical disk, and to an optical element used in an optical pick-up.

BACKGROUND OF THE INVENTION

The operation of an optical head that is one of conventional optical information processors is described with reference to FIGS. 18(a) and 18(b). Light emitted from a semiconductor laser 18-1, an exemplary light source, passes through a hologram 18-5 as a separation element and then is focused on an optical disk 18-2, as an exemplary information recording media, by an objective lens 18-3. After passing through the objective lens, light reflected from the optical disk is diffracted by the hologram and is incident onto first photodetectors 18-4-1 and 18-4-2. An aperture in an optical path from the light source to the optical disk (hereinafter referred to simply as an "incoming path") through which light passes is determined by an objective lens holder 18-6. A circular aperture is used in many cases. An aperture NA corresponds to a diameter of light being incident onto the objective lens. The diameter D satisfies the relationship of $$D=2 \times f \times NA,$$

wherein f represents a focal length of the objective lens. Since the focal length f is constant, the size of the NA corresponds to the size of the diameter D. The aperture in an optical path from the optical disk to the photodetectors (hereinafter referred to simply as a "return path") through which light reflected from the optical disk passes also is determined by the objective lens holder 18-6. Therefore, the apertures in the incoming and return paths are equal.

A detection case of various signals is described. When the hologram is formed of a part of a Fresnel lens, it can be formed so that diffracted light in one side is focused before reaching the photodetector 18-4-1 and diffracted light in the other side is focused at a position behind the photodetector 18-4-2 as shown in FIG. 18. As shown in a view seen from the A direction in FIG. 18, when the respective photodetectors 18-4-1 and 18-4-2 are formed while being divided into three parts, a focus error signal FE in a SSD (spot size detection) system can be detected from the calculation result of outputs from the respective photodetectors. The FE can be obtained from either:

$$FE=(18\text{-}4\text{-}1b)-(18\text{-}4\text{-}2b) \quad (1) \text{ or}$$

$$FE=((18\text{-}4\text{-}1a)+(18\text{-}4\text{-}1c)+(18\text{-}4\text{-}2b))-((18\text{-}4\text{-}1b)+(18\text{-}4\text{-}2a)+(18\text{-}4\text{-}2c)) \quad (2).$$

When a track direction on an optical disk coincides with the information track direction shown in FIGS. 18(a) and 18(b), a far field pattern as a diffraction pattern produced by a track is formed at spots on the photodetectors as shown in the view seen from the A direction. Therefore, the tracking error signal TE can be obtained from any one of:

$$TE=(18\text{-}4\text{-}1a)-(18\text{-}4\text{-}1c) \quad (3),$$

$$TE=(18\text{-}4\text{-}2a)-(18\text{-}4\text{-}2c) \quad (4), \text{ and}$$

$$TE=((18\text{-}4\text{-}1a)+(18\text{-}4\text{-}2c))-((18\text{-}4\text{-}1c)+(18\text{-}4\text{-}2a)) \quad (5).$$

A data information signal RF of an optical disk can be obtained from all the outputs of the photodetector 18-4-1 or 18-4-2, or the total outputs of the photodetectors 18-4-1 and 18-4-2.

FIG. 19 shows a configuration of an optical disk device in another conventional example using two laser beam sources that emit beams with different wavelengths from each other. This optical disk device has two laser beam sources 19-1 (emitting a beam with a wavelength $\lambda 1$) and 19-2 (emitting a beam with a wavelength $\lambda 2$) that emit beams with different wavelengths from each other. The laser beam 19-21 with a wavelength $\lambda 1$ (in the case of DVD or the like, $\lambda 1=660$ nm) emitted from the laser beam source 19-1 passes through a polarization hologram element 19-3.

This polarization hologram element is formed by forming a grating with a depth of d in a substrate made of an anisotropic material such as lithium niobate and filling groove parts of the grating with an isotropic material (with a refractive index of n1). Generally, given the phase difference $\phi$ between a beam passing through a groove portion and a beam passing between the groove portions, transmittance is represented by $\cos^2(\phi/2)$. When the substrate has refractive indexes of n1 and n2 with respect to polarized lights parallel and perpendicular to the grating grooves respectively, $\phi=0$ holds with respect to the polarized light parallel to the grating grooves and therefore the transmittance is 1. On the other hand, with respect to the polarized light perpendicular to the grating grooves, $\phi=2\pi(n1'n2)$ d/$\lambda$. Therefore, when the depth d is set to obtain $\phi=\pi$, the transmittance is 0, i.e. the polarized light is totally diffracted.

Consequently, when considering the polarization direction of the beam 19-21 emitted from the laser beam source 19-1 and groove orientation of the polarization hologram element 19-3, the laser beam 19-21 is allowed to pass through the element 19-3 without being diffracted. The transmitted light 19-22 is converted from linearly polarized light (S-wave) into circularly polarized light 19-23 by a 1/4 wave plate 19-4, is reflected by a surface of a prism 19-5, and then is collimated into parallel light 19-24 by a collimator lens 19-6. The parallel light 19-24 enters an objective lens 19-8 mounted on a moving element 19-14 of an actuator via a mirror 19-7 for bending an optical path and is incident onto a signal surface 19-9 of the optical disk.

In the case of recording on the signal surface, by increasing the power for emitting beams of the laser beam source 19-1 and modulating light corresponding to a recording signal, a required signal is recorded on the signal surface 19-9.

The light 19-25 reflected from the signal surface 19-9 travels in the opposite direction to the incoming path. The light 19-25 is converted to linearly polarized (P-wave) light 19-26 by the 1/4 wave plate 19-4 and passes through the polarization hologram element 19-3. In this case, due to polarization dependability of the element 19-3 the light is branched into a positive first-order diffracted light 19-27 and a negative first-order diffracted light 19-28 whose symmetry axis is the incident-light axis. The lights 19-27 and 19-28 are incident onto detection surfaces on photodetectors 19-105 provided adjacently to the laser beam source 19-1. Thus, a control signal and a reproduction signal are obtained to reproduce information.

On the other hand, a laser beam 19-29 emitted from the semiconductor laser beam source 19-2 emitting a beam with the other wavelength $\lambda 2$ (in the case of CD or the like, 790 nm) passes through a hologram element 19-11 to be diffracted and branched into three beams (a positive first-order diffracted light, a negative first-order diffracted light, a zeroth-order light). The three beams pass through the prism 19-5 while being limited by an aperture element 19-12 provided on a light-incident surface of the prism 19-5 and are collimated by the collimator lens 19-6 into convergent light 19-30. Then, the convergent light passes through the objective lens 8 via a mirror 19-7 for bending an optical path, thus being incident onto a signal surface 19-15 of an optical disk whose substrate has a different thickness from that when using the laser beam source 19-1. In this case, the diffracted light caused by the hologram element 19-11 is allocated to three spots on the signal surface and is used for the detection of a tracking control signal and a reproduction signal by a so-called three-beam tracking method. Light 19-31 reflected from the signal surface 19-15 is diffracted by the hologram element 19-11 via the mirror 19-7, the collimator lens 19-6, and the prism 19-5. Then, the diffracted light is incident onto detection surfaces of photodetectors 19-16, thus detecting signals to reproduce information. The objective lens 19-8 is designed to have a shape that enables aberration to be minimum by optimally designing the aperture and the optical system for respective disks having a substrate thickness of 0.6 mm for the beam with the wavelength $\lambda 1$ and having a substrate thickness of 1.2 mm for the beam with the wavelength $\lambda 2$. In other words, with respect to the beam with the wavelength $\lambda 2$, the aperture is limited by the aperture element 19-12 to form an optimum aperture.

With increase in density of the data information, further improvement in recording and reproducing ability is required in optical disk devices. Generally, in order to record and reproduce signals with higher density, a focusing spot on a disk is reduced in size. That is, it is conceivable that the wavelength of light emitted from a light source is shortened or NA of an objective lens is increased. However, in general-purpose optical disk devices used in a general office or at home, an available short-wavelength light source is a semiconductor laser emitting a red beam with 660 nm at present. A semiconductor laser emitting a beam with a shorter wavelength than that lacks in reliability and therefore it is difficult to use it for recording purpose in the present situation. When the NA of the objective lens is increased (i.e. when the aperture of an objective-lens holder is enlarged), recording/reproducing characteristics are improved in part. However, margins for tilt and defocus are reduced greatly, which has been a problem. In one or more embodiments, it is a first object of the present invention to provide an optical disk device in which excellent recording and reproduction can be performed on an optical disk with higher density and the margins are not reduced at the same time.

On the other hand, there have been the following three problems in a conventional optical disk device using the two laser beam sources shown in FIG. 19.

Firstly, when the lens is shifted in a track direction of an optical disk, the relative position of the lens and the aperture element varies, thus causing asymmetry in the aperture. Consequently, aberration (mainly spherical aberration and coma aberration) is increased, thus deteriorating signal quality considerably.

Secondly, similarly when the lens is shifted, the relative position of the lens and the hologram varies and therefore unbalance in quantity of lights divided by the hologram and distributed to photodetectors occurs, thus causing offset of a signal due to DC components, which is not preferable in tracking control.

Thirdly, generally due to refractive index variance of an objective lens or a collimator lens, when the wavelength mode of a beam emitted from a laser beam source is changed by power modulation for recording and reproduction, momentary axial aberration (i.e. chromatic aberration) occurs. Consequently, a relative position error (defocus) between a lens and a signal surface is caused. In order to prevent this, any chromatic aberration compensation element is required. FIGS. 20 (a) and 20(b) show a cross-sectional structural view and a plane view of a conventionally proposed chromatic-aberration compensation element 20-160 (see JP-A-6-82725 about the details). The chromatic-aberration compensation element 20-160 is formed of a glass plate having a refractive index n in which a concentric stepped structure 20-150 is formed. In the figure, the phase of a beam with a wavelength $\lambda$ that passes through the concentric stepped structural portion having a stepped depth t represented by:

$$t=\lambda/(n-1)$$

is shifted for $2\pi$ between adjacent stepped portions. However, with respect to undulation, the same wavefront is formed. On the other hand, when the wavelength is shifted from $\lambda$, the phase of the light is shifted slightly between adjacent stepped portions. However, since this stepped structure is formed in a concentric shape, an almost spherical wave is generated in a direction canceling axial aberration caused by the chromatic aberration. Thus, the aberration can be compensated by combining this element with a lens.

In order to solve all the three problems of the optical disk device shown in FIG. 19, it is preferable to mount all the components described above (the aperture element, the hologram element, the chromatic-aberration compensation plate) on a moving element. However, when all these elements are mounted, the moving element becomes very heavy and in addition, it is difficult to keep the actuator in balance. Further, as the weight of the actuator increases, more energy is required for its operation, thus causing problem of high power consumption. In addition, since all the elements must be positioned accurately with respect to the center of lenses (the center of optical axes), highly accurate assembly processes are necessary, thus decreasing mass-productiveness. In one or more embodiments, a second object of the present invention is directed to solve these problems.

SUMMARY OF THE INVENTION

In order to attain the first object, one or more embodiments of the present invention provide a configuration in which NA of an objective lens positioned in an incoming optical path from a semiconductor laser to an optical disk is designed to be larger than that in a return path from the optical disk or NA is varied in recording information and in reproducing information.

This configuration enables recording/reproducing ability to be improved since light is focused onto an optical disk with high NA. In addition, since reflected light from the optical disk is detected with low NA, margins for tilt and defocus are not reduced. Furthermore, since unnecessary signal components contained in the reflected light can be eliminated, a S/N (signal-to-noise ratio) of an information signal also increases. Thus, a high-performance optical disk device can be obtained. Alternatively, by varying the aperture of an objective lens in recording information and in reproducing information, an optical disk device in which recording density and recording quality are increased without deteriorating reproduction quality can be obtained.

Further, one or more embodiments of the present invention employ the following means to attain the second object. Embodiments of the present invention are characterized by an optical element in which a thin film for varying an aperture area corresponding to each of two wavelengths (wavelengths λ1 and λ2; λ1<λ2) of light is formed on one of two glass plates of a polarization hologram element. The polarization hologram element is formed by sandwiching a diffraction grating made of a birefringent material and a wave film with an optical thickness of $(N1+¼)λ1≈N2×λ2$, wherein N represents a natural number, between the glass plates. Embodiments of the present invention are characterized by an optical element having a structure having a plurality of concentric stepped portions on the other glass plate. In one or more embodiments, the present invention is characterized in that wavelengths λ1 and λ2 of two types of lights passing through an optical element satisfy the relationship of $(N1+¼)λ1≈N2×λ2$, wherein N1 and N2 represent natural numbers. Embodiments of the present invention are characterized in that an optical element using a wave film with an optical thickness of $(N1+⅕)λ1$ instead of the wave film with an optical thickness of $(N1+¼)λ1$ is mounted on an actuator.

According to the aforementioned configurations of the present invention, the following excellent effects can be obtained. By varying the aperture in an incoming path and in a return path in recording information on or reproducing information from an optical disk, excellent recording and reproduction are performed by obtaining a spot focused with high NA in the incoming path, and in the return path, crosstalk compositions, intersymbol interference compositions, high aberration compositions contained a lot in reflected light from the optical disk that passes through high NA portions are eliminated by applying low NA, thus enabling high-quality signal reproduction. In addition, the margins for defocus and tilt are not reduced.

Furthermore, by using a diffraction grating as an aperture element and combining with another element to form one component, excellent effects such as reduction in size, stabilization, reduction in cost, and the like can be obtained.

By leading at least a part of light outside the aperture in the return path to second photodetectors and calculating with outputs from first photodetectors, intersymbol interference compositions and crosstalk compositions can be canceled out, thus providing an excellent effect in which further excellent information signals can be obtained.

In addition, by designing the aperture of an aperture element to be variable, an optimum aperture can be set for respective optical disks and therefore an excellent effect enabling excellent signal reproduction continuously can be provided, thus obtaining an optical disk device in which recording density and recording quality are improved without deteriorating reproduction quality.

Moreover, according to the aforementioned configurations, a moving element is not greatly increased in weight, thus suppressing the increase in power consumption. In addition, precise positioning between respective elements is not required, thus facilitating the assembly.

DETAILED DESCRIPTION OF THE INVENTION

First Embodiment

Figure 18:
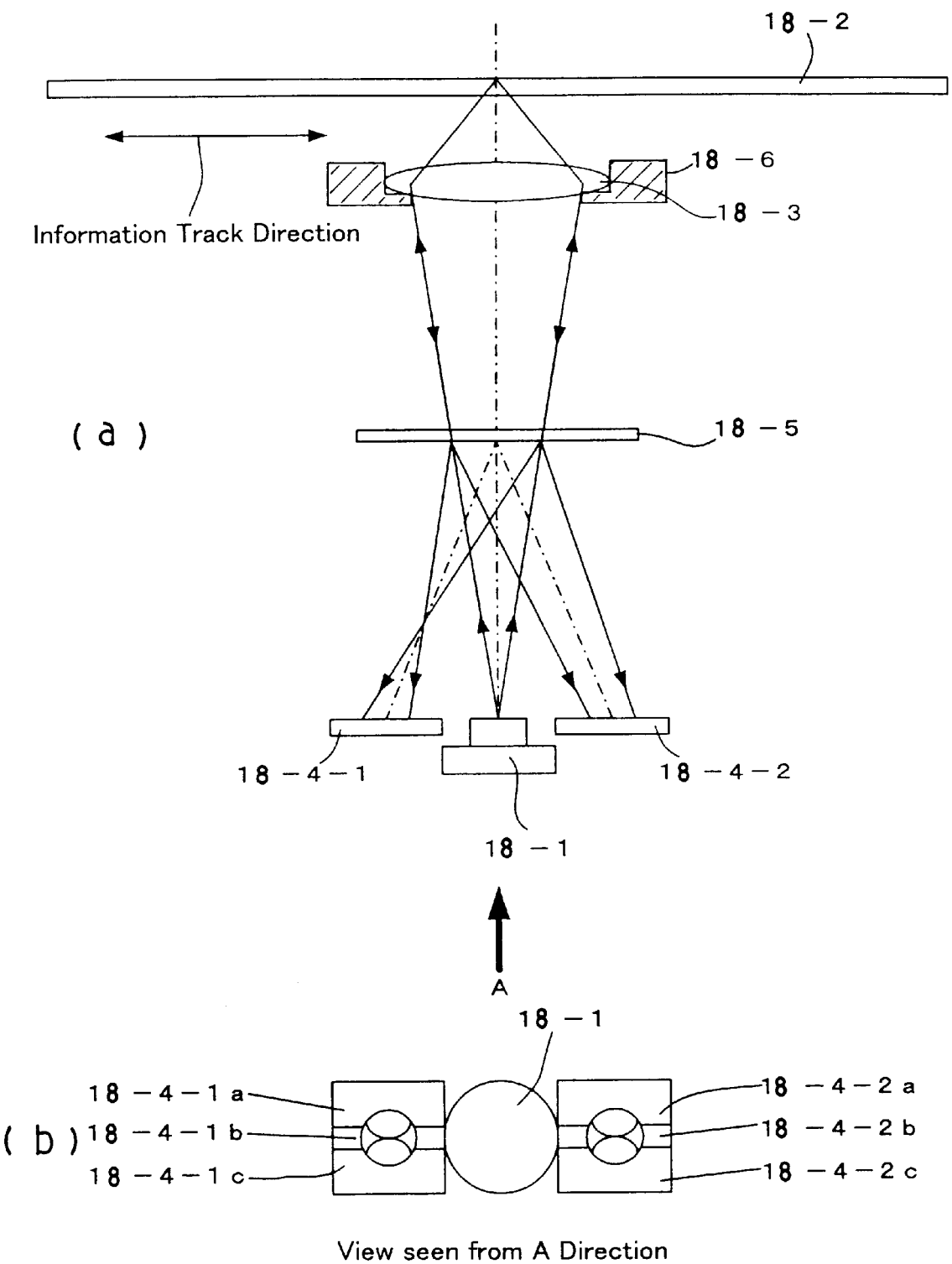
FIGS. 18(a) and 18(b) show structural views of a conventional optical information processing method.
Figure 19:
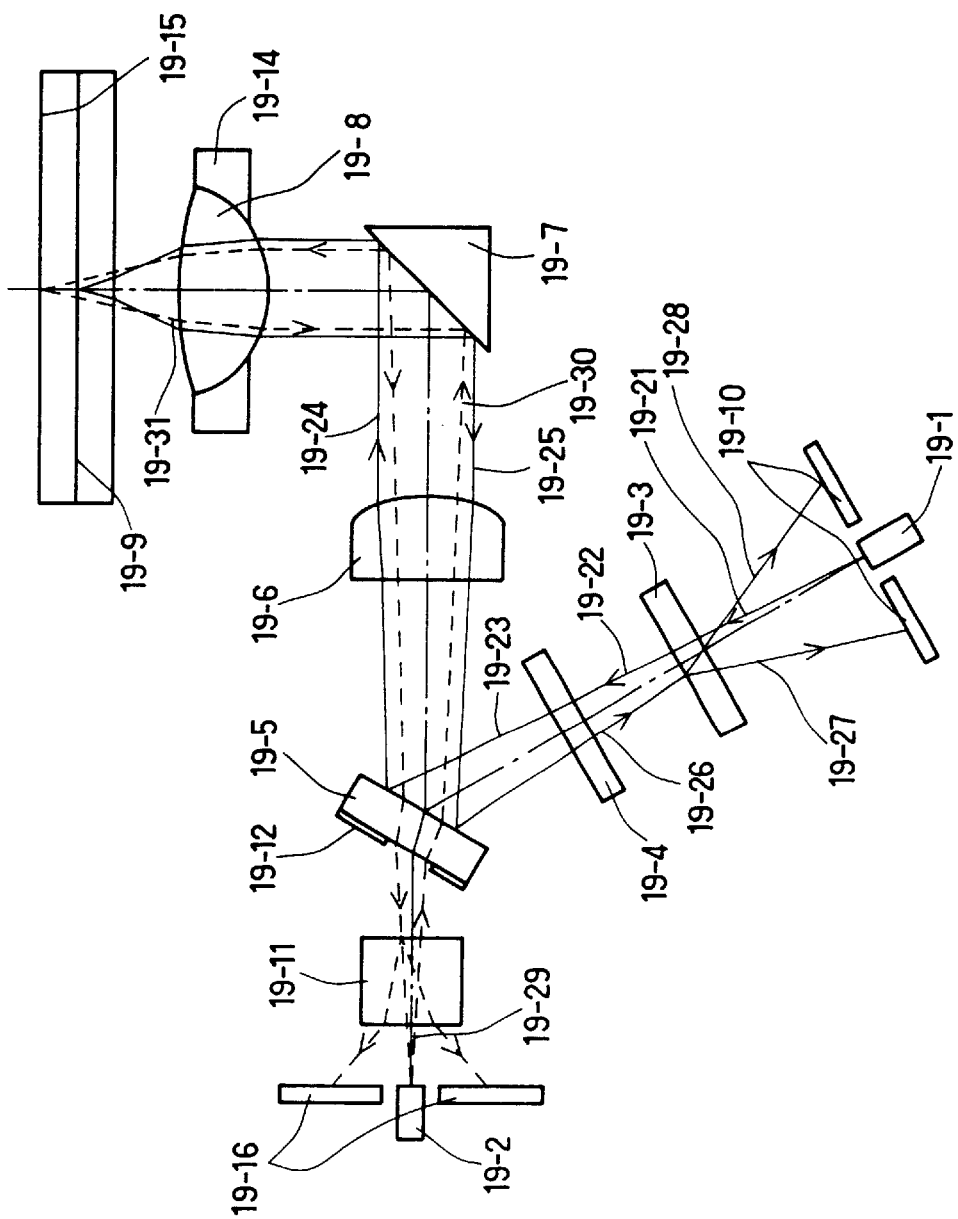
FIG. 19 shows a configuration of a conventional optical disk device.
Figure 20:
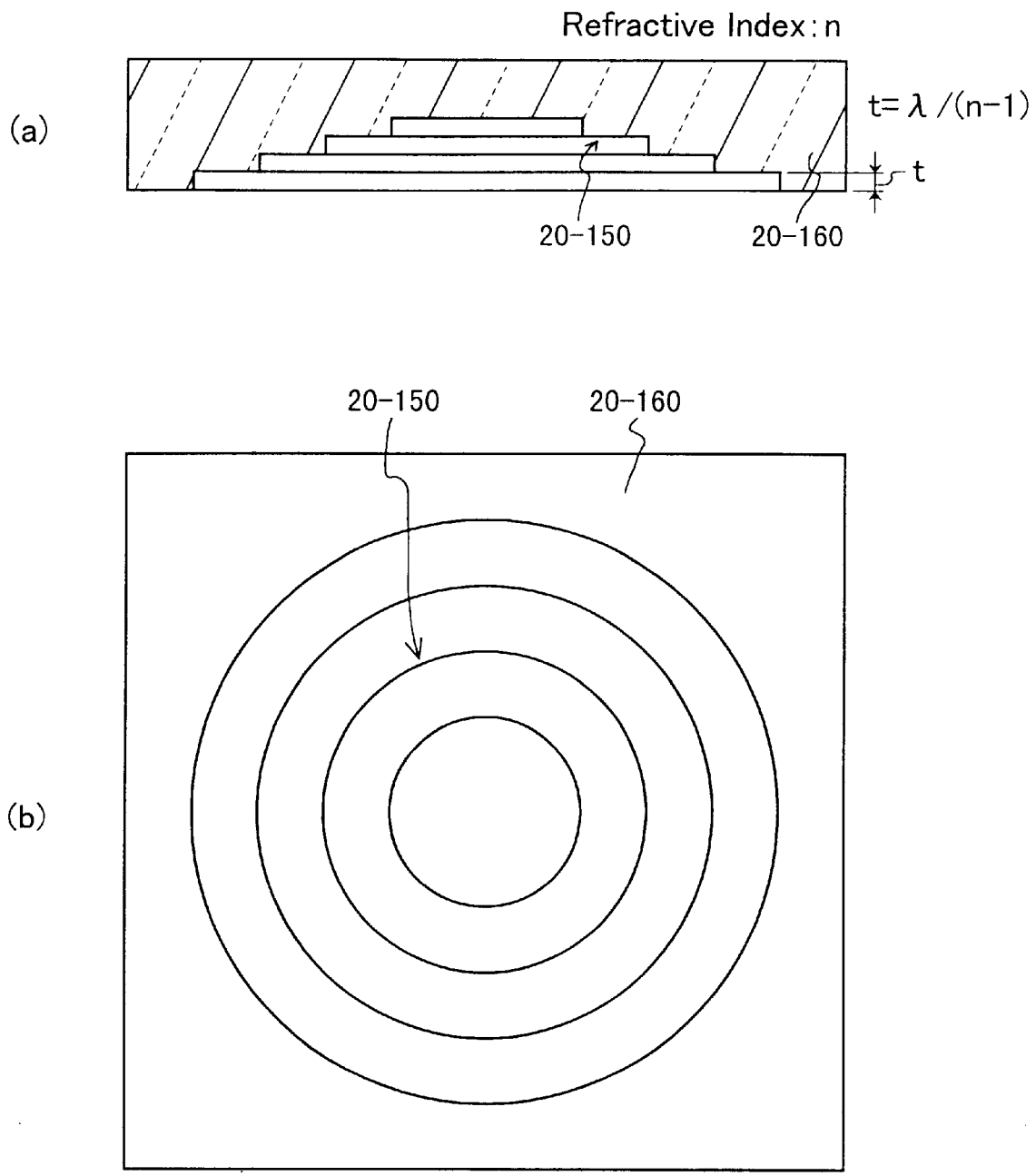
FIGS. 20(a) and 20(b) show a cross sectional view and a plane view of an element having a concentric stepped structure as a conventional means for compensating chromatic aberration.

FIGS. 1(a), 1(b), and 1(c) show structural examples of an optical information processing method according to a first embodiment of the present invention. The description of the same points, such as a detection principle of FE, TE, RF signals as those in the conventional example, shown in FIGS. 18(a) and 18(b) is omitted. In the conventional example, the NA in an incoming path and the NA in a return path are determined by the objective lens holder 18-6 and are equal. In the present embodiment, an aperture is determined by an objective lens holder 1-6, a λ/4 plate 1-7 that is a component of an aperture element, and a diffraction grating 1-8. The diffracting grating 1-8 is provided with a grating at the portion indicated with hatching in the figure.

Figure 1:
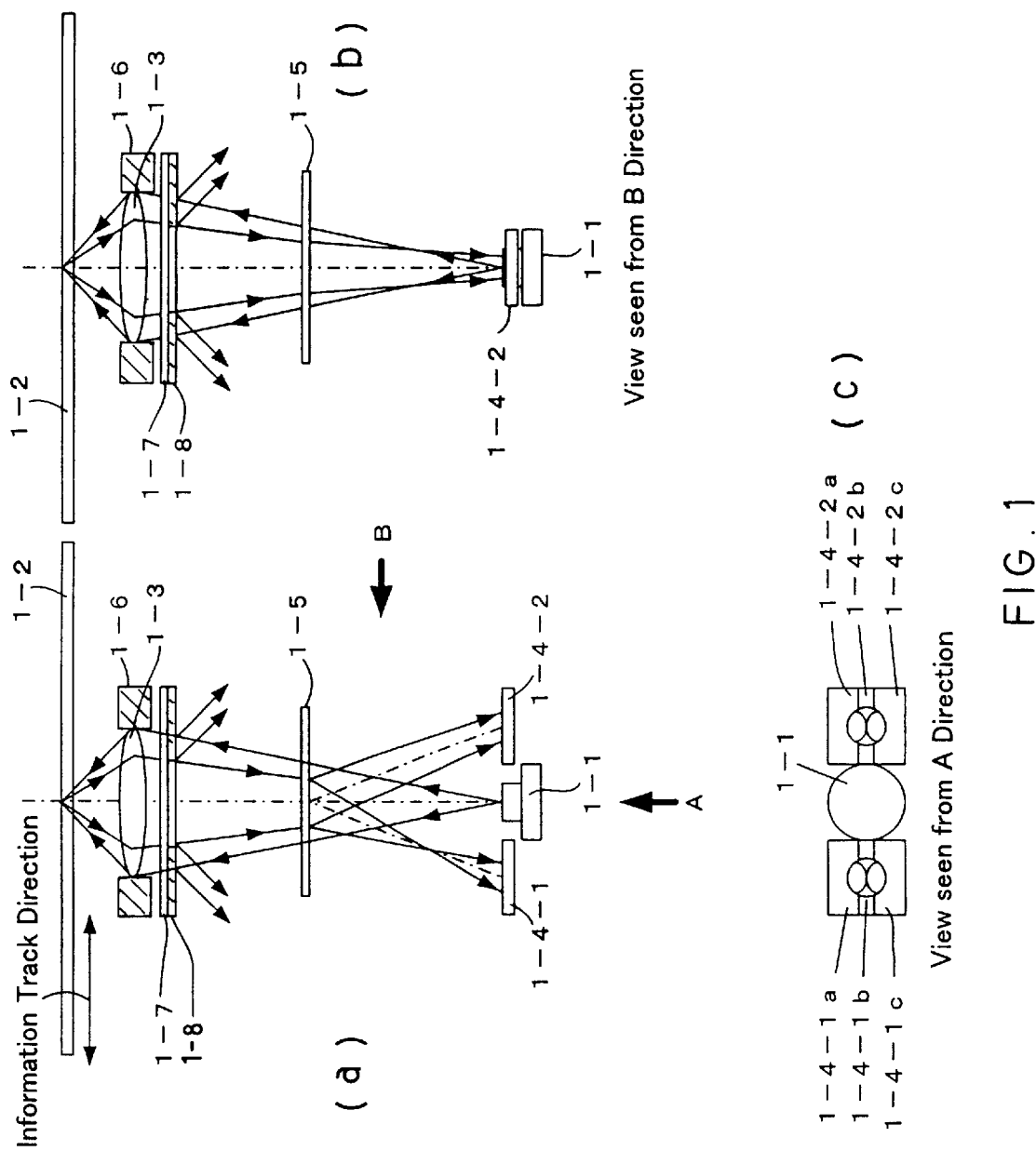
FIGS. 1(a), 1(b), and 1(c) show structural views showing an optical information processing method according to a first embodiment of the present invention.

The operation of the aperture element is described as follows. The λ/4 plate 1-7 has a function of providing a phase difference of λ/4 to incident light. The diffraction grating 1-8 is a grating having concave and convex portions made of an anisotropic material (with a refractive index of, for example, n1 and n2) such as, for example, lithium niobate and is formed by filling the concave portions with an isotropic material with a refractive index (for example, n1) equal to any one of the two refractive indexes of the anisotropic material. When linearly polarized light is incident onto the diffraction grating 1-8, all the incident light passes through the diffraction grating 1-8, since with respect to light with a polarization direction in which the refractive index of n1 of the anisotropic material is effective, the diffraction grating 1-8 does not function (i.e. this case is equal to the case where no diffraction grating is provided). On the other hand, with respect to incident light with a polarization direction orthogonal to the above-mentioned polarization direction, the diffraction grating 1-8 functions to diffract the incident light. In FIGS. 1(*a*), 1(*b*), and 1(*c*), the polarization direction of a beam emitted from the semiconductor laser 1-1 corresponds to the polarization direction of a beam for which the grating of the diffraction grating 1-8 does not function. Therefore, all the incident light onto the diffraction grating 1-8 from the semiconductor laser 1-1 passes through the diffraction grating 1-8 regardless of the existence of the grating. Thus, the aperture NA1 in the incoming path is not determined by the aperture element, but is determined by the objective lens holder 1-6. On the other hand, reflected light from the optical disk passes through the λ/4 plate 1-7 twice, i.e. in the incoming and return paths and therefore its polarization direction is orthogonal to that of a beam emitted from the semiconductor laser 1-1. Consequently, since the grating of the diffraction grating 1-8 is effective, light passes through the central part (the area without hatching in the figure) of the diffraction grating 1-8 to reach first photodetectors. However, the grating portion (indicated with hatching in the figure) diffracts light as shown in the figure and therefore the light does not reach the first photodetectors. The aperture NA2 in the return path is determined not by the objective lens holder 1-6 but by the diffraction grating 1-8.

As can be seen from FIGS. 1(*a*), 1(*b*), and 1(*c*), NA1 is greater than NA2. For facilitating the description, suppose that the NA2 is equal to the NA of the aperture element in the conventional example. In this case, when comparing the present embodiment with the conventional example, the aperture in the return path is equal but the aperture in the incoming path is larger in the present invention. This provides the following effects for the present invention, which are not provided by the conventional example.

(1) A spot size on an optical disk is proportional to λ/NA, wherein λ represents a wavelength. Therefore, in the present invention in which the aperture NA1 for the incident light onto the optical disk is greater than the NA in the conventional example, a small spot size can be obtain on the optical disk, thus improving recording sensitivity, recording quality, and resolution of reproduction signals and reducing crosstalk and intersymbol interference.

(2) The decrease in signal level caused by defocus is proportional to the square of NA and that caused by tilt is proportional to the cube of NA. In the present invention, since the aperture in the return path is NA2 that is equal to the conventional NA, the margins for defocus and tilt are equivalent to those in the conventional example. Therefore, although the aperture in the incoming path is larger, the margins are not reduced in the present invention.

(3) The crosstalk components due to adjacent tracks, intersymbol interference components due to sequential two signals, and aberration components due to defocus and tilt are contained a lot in the area (surroundings of the aperture) with high NA for the reflected light from the disk. In the present embodiment, the aperture in the return path is set to be smaller than that in the incoming path. Consequently, light containing a lot of crosstalk components, intersymbol interference components, and aberration components can be eliminated, thus obtaining excellent reproduction characteristics.

Figure 2:
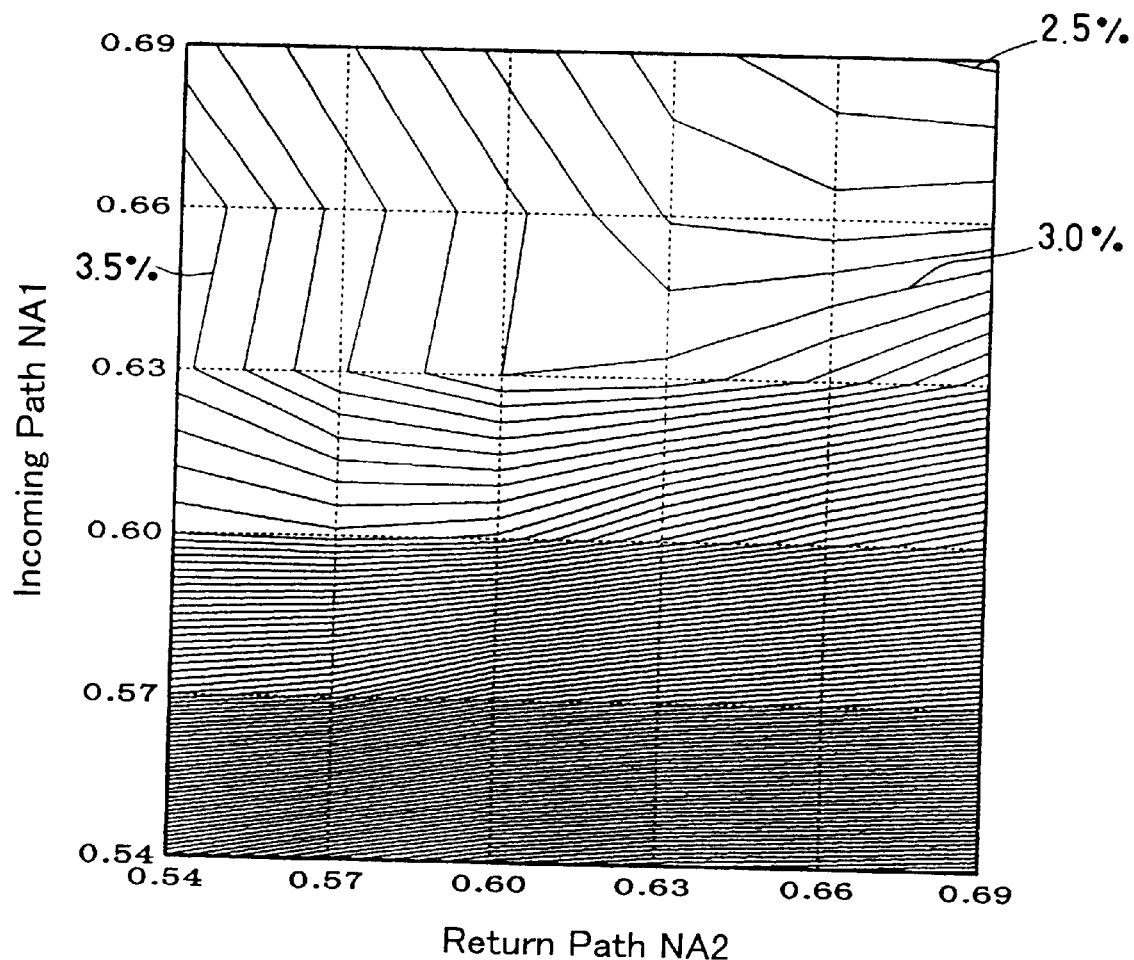
FIG. 2 is an analytical example according to the first embodiment of the present invention.

FIG. 2 shows an analytical example of reproduction characteristics according to the present embodiment. A wavelength λ of a beam emitted from an optical head reproducing random data comprising marks between about 0.4 μm and 2 μm as information signals on an optical disk having a track pitch of 0.6 μm is supposed to be 660 nm. FIG. 2 shows jitter in reproduction signals using NAs in the incoming and return paths as a parameter. In FIG. 2, the jitter is shown by contour lines at intervals of 0.1%. In the case of a conventional example, when both the NAs in the incoming and return paths are set to be 0.6 as a general aperture, the reproduction-signal jitter is about 4.05%. On the contrary, when NA1 in the incoming path is 0.63 and NA2 in the return path is 0.6 as an example of the present embodiment, the reproduction-signal jitter is 3.0%, which shows 1.05% improvement compared to the conventional example. As a conventional example, when both the NAs in the incoming and return paths are set to be 0.63, the reproduction-signal jitter is about 3.07%, which falls 0.07% short of that in the present invention. In addition, since the NA in the return path also is 0.63, the defocus margin and the tilt margin are reduced by about 9% and about 14% respectively compared to those in the present embodiment.

In the case of the supposed optical disk in the above-described analysis, when the NA2 in the return path is set to be a general value of 0.6, the jitter decreases gradually as the NA1 in the incoming path increases. However, the variation in jitter becomes small, when the NA1 is in the neighborhood of 0.63 to 0.67. In order to reduce the influence of the variation in the NA1, it is desirable to set the NA1 to be between 0.63 and 0.67. When priority is given to the defocus- and tilt-margin expansion by reducing the NA2 in the return path, it is found that the jitter does not deteriorate even when the NA2 in the return path is 0.54 or less in the case where the NA1 in the incoming path is 0.60. An optimum NA ratio varies depending on the purpose such as, for example, giving priority to jitter, giving priority to margins, allowing the jitter and margins to be compatible.

However, the optimum condition can be found when the NA ratio is set substantially in a range of $$1 < NA1/NA2 < 1.2.$$

Figure 3:
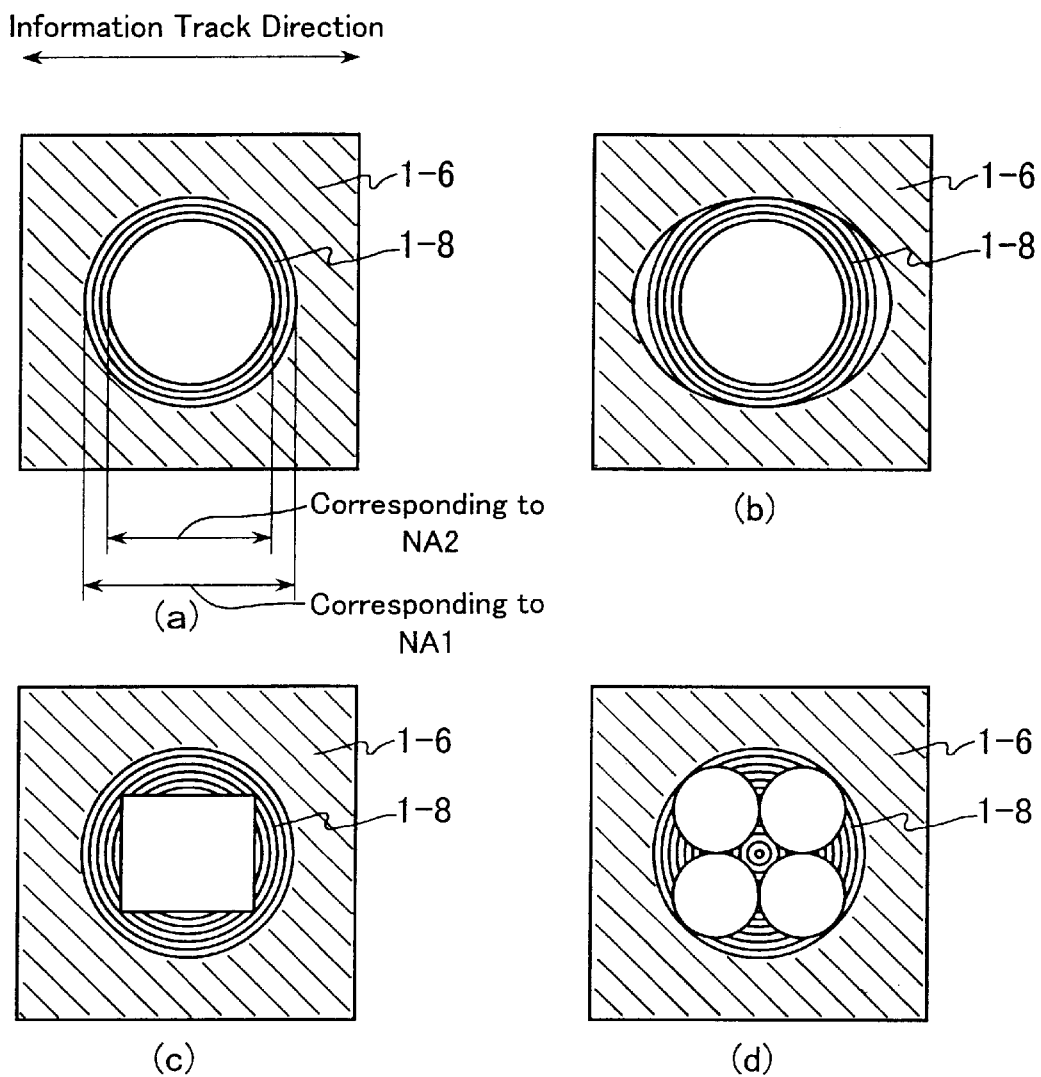
FIGS. 3(a), 3(b), 3(c) and 3(d) show structural examples of an aperture element according to the first embodiment of the present invention.

FIGS. 3(*a*), 3(*b*), 3(*c*), and 3(*d*) show examples of an aperture element in the present embodiment. FIG. 3(*a*) is a view of the aperture element with the configuration shown in FIGS. 1(*a*), 1(*b*), and 1(*c*) that is seen from the side of the objective lens 1-3. The portion indicated with hatching is the lens holder 1-6 and its aperture corresponds to NA1 in the incoming path. Concentric portions inside the hatching portion denote the grating of the diffraction grating 1-8, and its aperture corresponds to NA2 in the return path. In FIG. 3(*a*), both the apertures in the incoming and return paths are formed in circular shapes. However, the shapes of the apertures are not limited to the circular shapes. In the case of the circular shape, an advantage of facilitating the processing and formation of apertures of the lens holder 1-6 and the like can be obtained. Generally, however, an optimum NA in a radial direction on an optical disk is different from that in a tangential direction in some cases. In this case, the aperture with an elliptical shape is preferred to that with a circular shape. FIG. 3(b) shows the case where the aperture of the objective lens holder 1-6 has an elliptical shape with high NA in the tangential direction. The direction in which the aperture has high NA is not limited to the tangential direction and may be the radial direction. Further, there may be the case where the aperture formed by the diffraction grating 1-8 in the return path has an elliptical shape. The excellent effect of the present embodiment can be obtained by a smaller aperture in the return path compared to that in the incoming path. Therefore, generally the shape of the aperture is not a problem. Even when the aperture in the return path has a square shape as shown in FIG. 3(c), the effect of the invention is not reduced. FIG. 3(d) shows an example of aperture in the return path formed of four circular apertures, which has the excellent effect of the present invention. In addition, since light passing through the central portion of the aperture in the incoming path also is eliminated in the return path, light containing a lot of DC components is eliminated. Therefore, the example also has an advantage of improving a modulation factor of data information signal RF. As described above, in one or more embodiments, the present invention is characterized by setting the aperture in the return path to be smaller than that in the incoming path and therefore the shape of the aperture is not particularly a problem.

Second Embodiment

Figure 4:
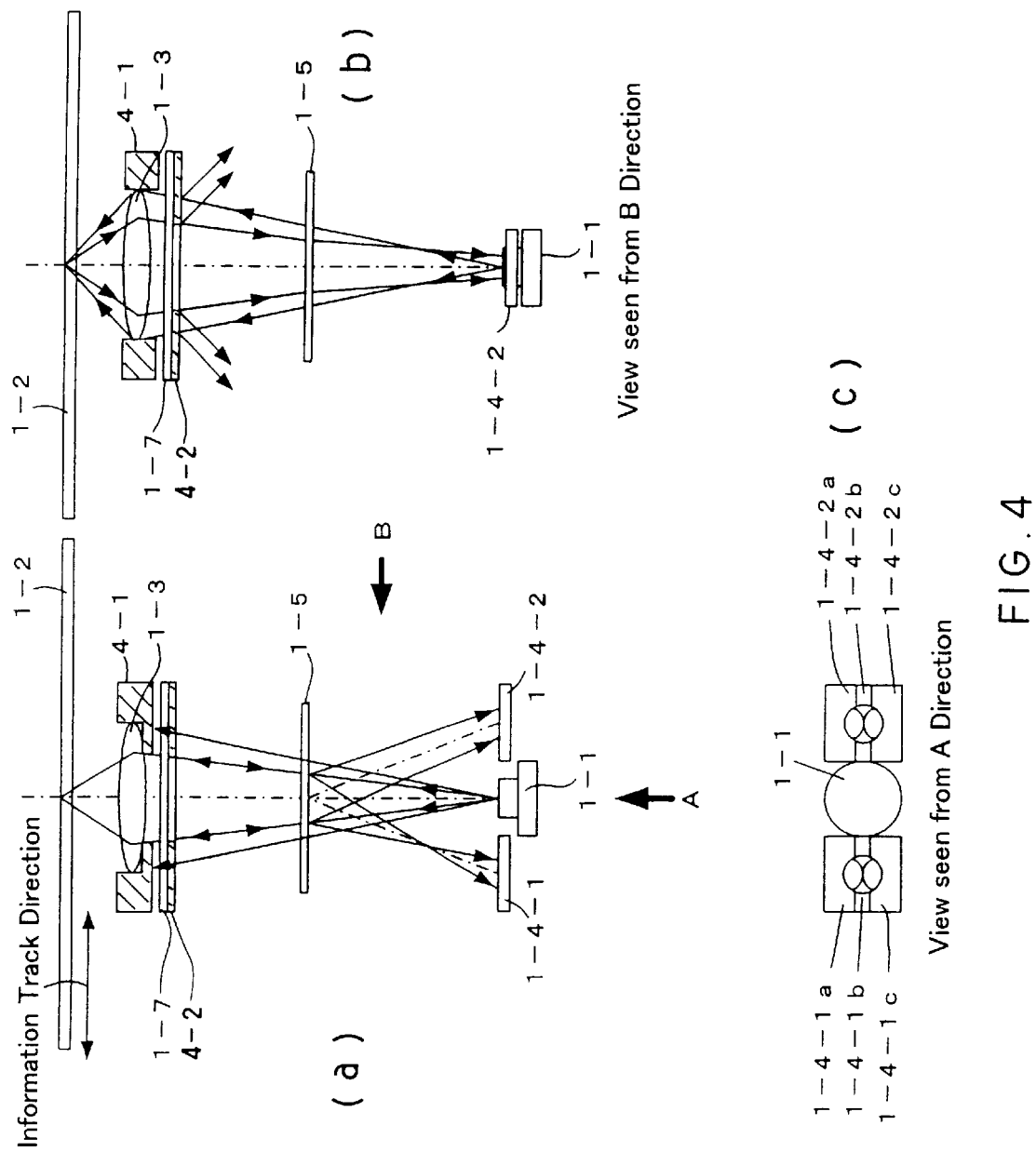
FIGS. 4(a), 4(b), and 4(c) show structural views showing an optical information processing method according to a second embodiment of the present invention.

FIGS. 4(a), 4(b), and 4(c) show structural examples according to a second embodiment of the present invention when the apertures in the incoming and return paths are varied only in the radial direction. The description of the same parts as those in the configuration shown in FIGS. 1(a), 1(b), and 1(c) is omitted. As shown in FIGS. 4(a), 4(b), and 4(c), the aperture formed by an objective lens holder 4-1 in the incoming path and the aperture formed by a diffraction grating 4-2 in the return path are set to be equal in the tangential direction. On the contrary, the aperture NA2 (R) in the return path is set to be smaller than the aperture NA1 (R) in the incoming path in the radial direction shown in FIG. 4(b). In an optical disk system that is affected less by intersymbol interference in the tangential direction, the following advantages are obtained compared to an optical disk system having the configuration shown in FIGS. 1(a), 1(b), and 1(c).

(1) Since the aperture NA in the return path is smaller than that in the incoming path in the radial direction, not only the decrease in crosstalk in adjacent tracks and the improvement in recording sensitivity are achieved, but also crosstalk compositions and high aberration portions contained a lot in reflected light from a disk that passes through high NA portions can be eliminated. Consequently, excellent reproduction signals can be obtained, and in addition the margins are not reduced by defocus and tilt.

(2) Since the aperture in the incoming path is equal to that in the return path in the tangential direction, the loss in quantity of light due to reduction in NA in the return path can be reduced, thus obtaining reproduction signals with a high S/N.

Figure 5:
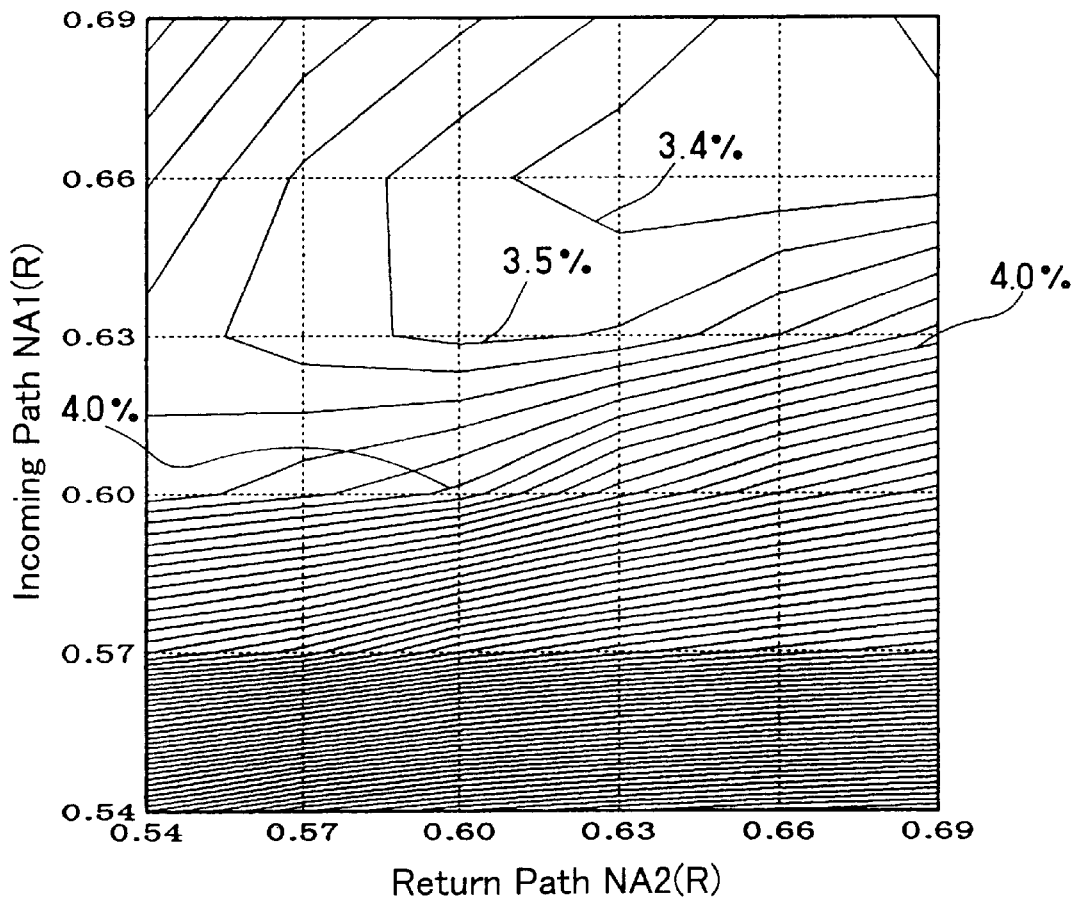
FIG. 5 is an analytical example according to the second embodiment of the present invention.

FIG. 5 shows an analytical example of reproduction characteristics when the apertures in the incoming and return paths are set to be 0.60 in the tangential direction and the apertures in the incoming and return paths are varied only in the radial direction. The parameter of the optical disk is the same as in the embodiment 1. When both the apertures in the incoming and return paths are 0.63 in the radial direction, jitter is about 3.54%. However, it can be found that when the aperture in the incoming path is fixed to 0.63 and the aperture in the return path is decreased from 0.63, the jitter is improved to 3.5% or less in the case where the aperture in the return path is between 0.585 and 0.62. On the contrary, when the aperture in the return path is fixed to 0.60 and the aperture in the incoming path is increased from 0.60, the minimum jitter is obtained in the case where the aperture in the incoming path is about 0.64 and the jitter is improved in the case where the aperture in the incoming path is between about 0.60 and 0.72. An optimum NA ratio varies depending on the purpose such as, for example, giving priority to jitter, giving priority to margins, allowing the jitter and margins to be compatible. However, the optimum condition can be found when the NA ratio is set substantially in the range of $$1<NA1(R)/NA2(R)<1.2.$$

Figure 6:
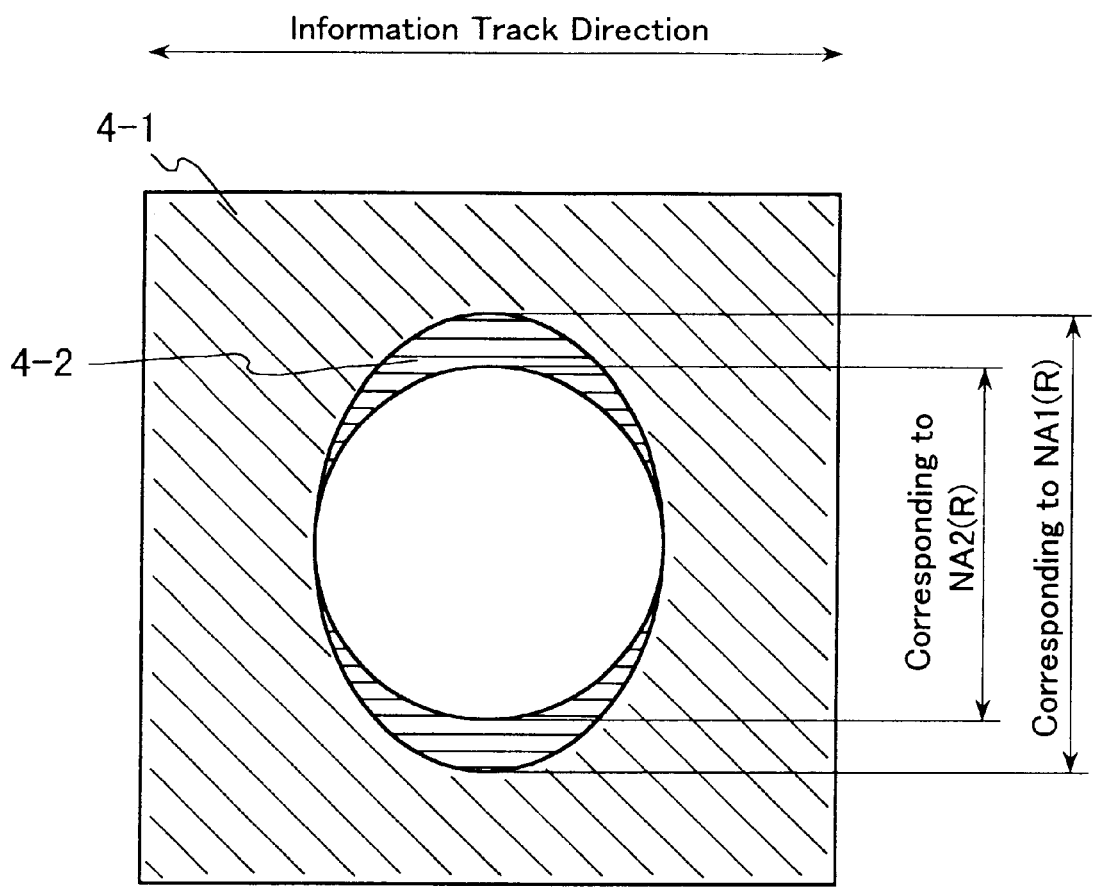
FIG. 6 is a structural example of an aperture element according to the second embodiment of the present invention.

FIG. 6 shows a structural example of an aperture element in the present embodiment. The hatching portion shows an objective lens holder 4-1 with an aperture in the incoming path having an elliptical shape with its major axis in the radial direction. The circular aperture inscribed in the elliptical aperture is an aperture formed by a diffraction grating 4-2 in the return path, and the portion indicated with horizontal lines in the figure is a grating. In the present configuration, since the circular aperture is inscribed in the elliptical aperture in the tangential direction, the aperture in the incoming path is equal to that in the return path in the tangential direction, and the aperture NA1(R) in the incoming path is larger than the aperture NA2(R) in the return path only in the radial direction. FIG. 6 illustrates the combination of an ellipse and a circle as shapes of apertures. However, the shapes of the apertures are not particularly limited as described in the first embodiment and as shown in FIGS. 3(a), 3(b), 3(c), and 3(d).

Third Embodiment

Figure 7:
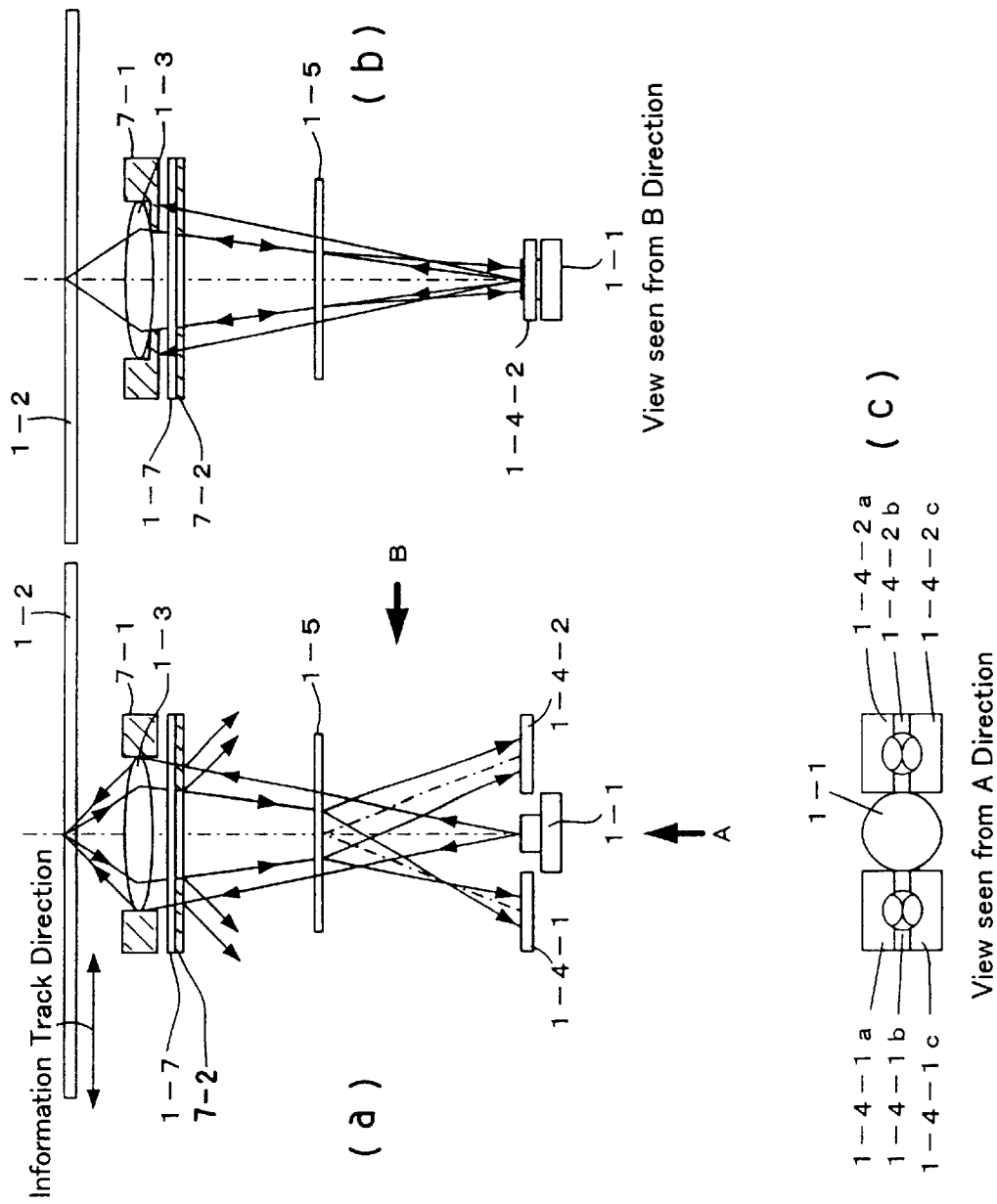
FIGS. 7(a), 7(b), and 7(c) show structural views showing an optical information processing method according to a third embodiment of the present invention.

FIGS. 7(a), 7(b), and 7(c) show structural examples according to a third embodiment of the present invention when apertures in incoming and return paths are varied only in the tangential direction. The description of the same parts as those in the configurations shown in FIGS. 1(a), 1(b), and 1(c) and 4(a), 4(b), and 4(c) is omitted. As shown in FIG. 7(b), the aperture formed by an objective lens holder 7-1 in the incoming path and the aperture formed by a diffraction grating 7-2 in the return path are set to be equal to each other in the radial direction. On the contrary, in the tangential direction, an aperture NA2(T) in the return path is set to be smaller than an aperture NA1(T) in the incoming path. In an optical disk system that is affected less by crosstalk in the radial direction, the following advantages are obtained compared to the configuration shown in FIGS. 1(a), 1(b), and 1(c).

(1) Since the aperture NA in the return path is smaller than that in the incoming path in the tangential direction, not only the decrease in intersymbol interference and the improvement in resolution and recording sensitivity are achieved, but also intersymbol interference compositions and high aberration portions contained a lot in reflected light from a disk that passes through high NA portions can be eliminated. Consequently, excellent reproduction signals can be obtained, and in addition the margins are not reduced by defocus and tilt.

(2) Since the aperture in the incoming path is equal to that in the return path in the radial direction, the loss in quantity of light due to reduction in the NA in the return path can be reduced, thus obtaining reproduction signals with a high S/N.

Figure 8:
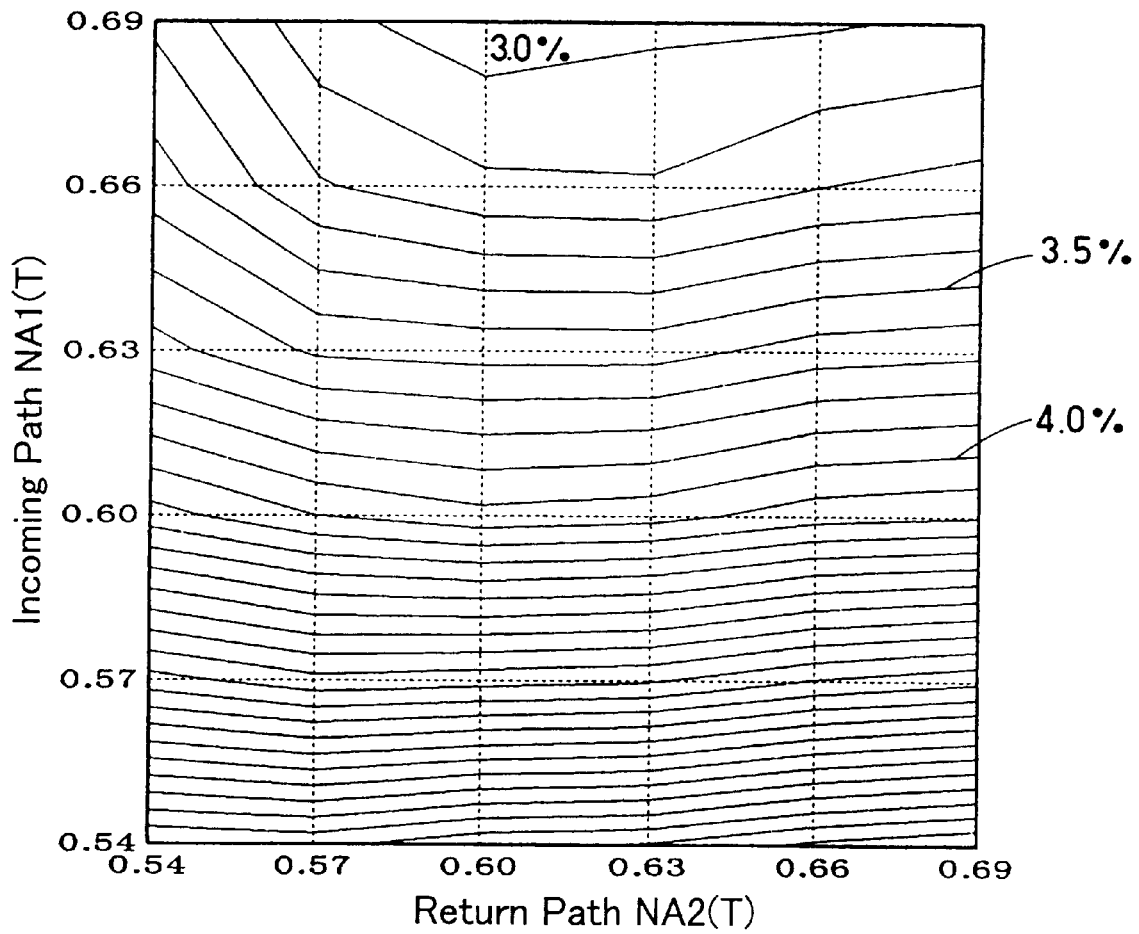
FIG. 8 is an analytical example according to the third embodiment of the present invention.

FIG. 8 shows an analytical example of reproduction characteristics when both the apertures in the incoming and return paths are set to be 0.60 in the radial direction and the apertures in the incoming and return paths are varied only in the tangential direction. The parameter of the optical disk is the same as in the first and second embodiments. When both the apertures in the incoming and return paths are 0.66 in the tangential direction, jitter is about 3.2%. However, it can be found that when the aperture in the incoming path is fixed to 0.66 and the aperture in the return path is decreased from 0.66, the jitter is improved to 3.2% or less in the case where the aperture in the return path is between 0.57 and 0.66. An optimum NA ratio varies depending on the purpose such as, for example, giving priority to jitter, giving priority to margins, allowing the jitter and margins to be compatible. However, the optimum condition can be found when the NA ratio is set substantially in the range of $$1 < NA1(T)/NA2(T) < 1.2.$$

Figure 9:
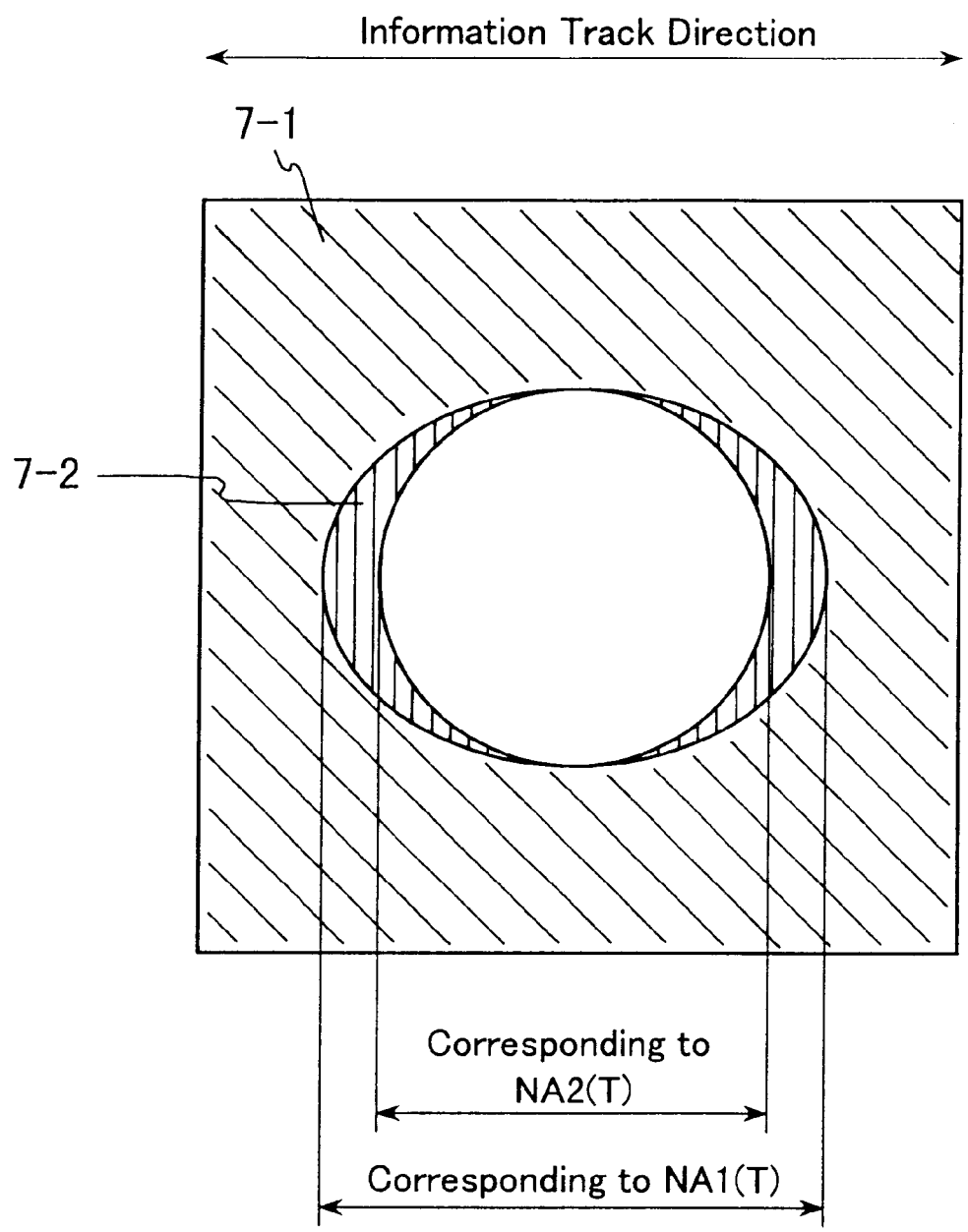
FIG. 9 is a structural example of an aperture element according to the third embodiment of the present invention.

FIG. 9 shows a structural example of an aperture element according to the third embodiment of the present invention. The hatching portion shows an objective lens holder 7-1 with an aperture in the incoming path having an elliptical shape with its major axis in the tangential direction. A circular aperture inscribed in the elliptical aperture is the aperture formed by a diffraction grating 7-2 in the return path, and the portion indicated with vertical lines in the figure is a grating. In the present configuration, since the circular aperture is inscribed in the elliptical aperture in the radial direction, the aperture in the incoming path is equal to that in the return path in the radial direction, and the aperture NA1(T) in the incoming path is larger than the aperture NA2(T) in the return path only in the tangential direction. FIG. 9 illustrates the combination of an ellipse and a circle as shapes of apertures. However, the shapes of the apertures are not particularly limited as described in the first embodiment and as shown in FIGS. 3(a), 3(b), 3(c), and 3(d).

Figure 10:
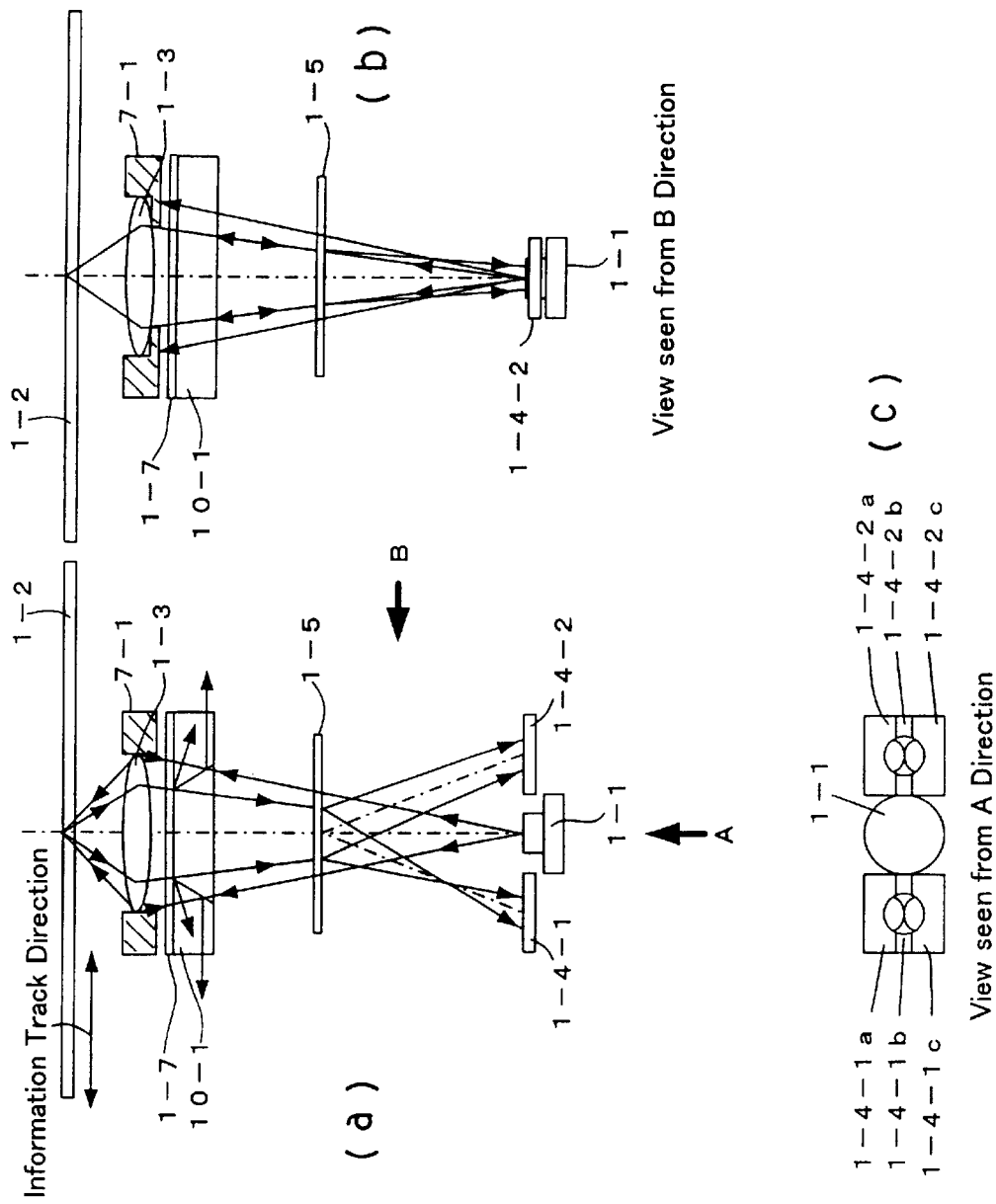
FIGS. 10(a), 10(b), and 10(c) show structural views showing another optical information processing method according to the third embodiment of the present invention.

FIGS. 10(a), 10(b), and 10(c) show structural examples of the present embodiment using a λ/4 plate 1-7 and a polarized beam splitter (hereinafter referred to as "PBS") 10-1 as aperture elements. In a polarization film of the PBS 10-1, incident light is transmitted or reflected depending on its polarization direction. Therefore, the PBS 10-1 has the same function as that of the diffraction grating 7-2. As an aperture element, the PBS is desirable for eliminating light passing through the high NA portions with a high quenching ratio, and the diffraction grating is desirable for achieving the reduction in size and thickness. As another configuration of the aperture element, it is possible to combine, for example, a λ/4 plate and liquid crystal. An optimum configuration may be selected depending on the intended use.

Fourth Embodiment

A configuration according to a fourth embodiment of the present invention is described with reference to FIGS. 11(a), 11(b), and 11(c). The description of the same parts as in the first to third embodiments is omitted. A semiconductor laser 11-1 as a light source and first photodetectors 11-2-1 and 11-2-2 are combined with a base 11-3 to form one component. A beam emitted from the semiconductor laser 11-1 is incident onto an optical disk 1-2 via a diffraction grating 11-5, a λ/4 plate 1-7, and an objective lens holder 11-4 that form one component with the objective lens 1-3. Reflected light from the optical disk 1-2 is diffracted by the diffraction grating and a part of the diffracted light is incident onto the first photodetectors. In the present embodiment of the invention, the diffraction grating 11-5 has both the functions of the diffracting grating 1-8 and the hologram 1-5 as a separation element in FIGS. 1(a), 1(b), and 1(c). The portion indicated with hatching in the diffraction grating 11-5 has a function of diffracting unwanted light outside the first photodetectors, and the central portion of the diffraction grating 11-5 has a function of the hologram 1-5. The present embodiment provides the following excellent effects.

(1) The diffraction grating also has the function of a hologram as a separation element, thus enabling the reduction in number of components, in size, and in cost.

(2) The aperture elements and the objective lens are combined to form one component, thus reducing the influence by the movement of the objective lens and the like.

(3) The light source and the first photodetectors are combined to form one component, thus achieving the size reduction and stabilization of an optical system.

It is not necessary to satisfy the above-mentioned effects (1), (2), and (3) at the same time. Even when one of the above-mentioned effects is satisfied individually according to the convenience in the configuration of the optical system or the like, the same individual effect can be obtained.

Figure 11:
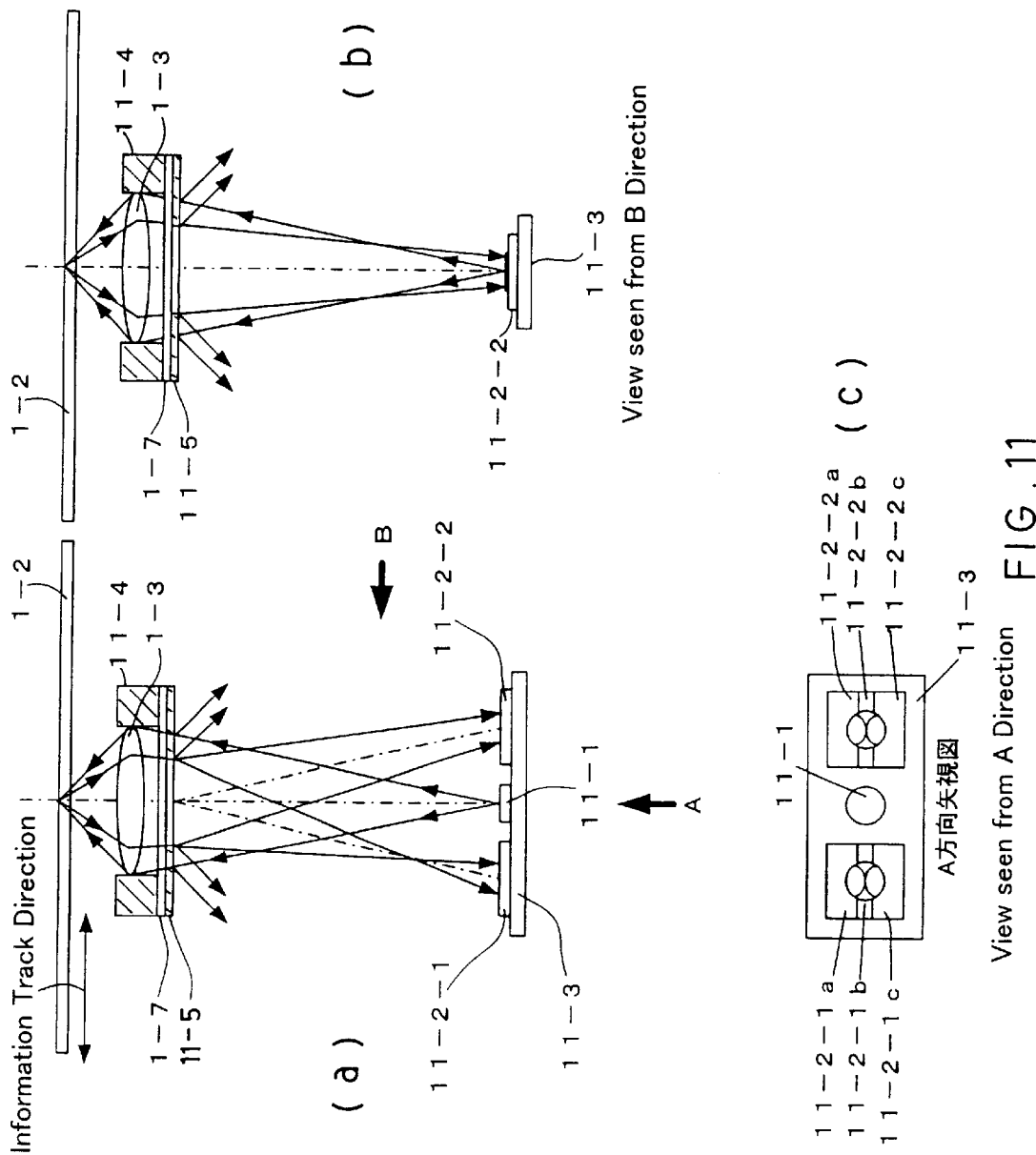
FIGS. 11(a), 11(b), and 11(c) show structural views showing an optical information processing method according to a fourth embodiment of the present invention.

In FIG. 11(c), exactly speaking, only the base 11-3 can be seen. In order to facilitate the description, the view is shown in a manner of seeing through the semiconductor laser and the photodetectors.

FIGS. 11(a), 11(b), and 11(c) show a configuration in which the apertures in incoming and return paths are varied from each other both in the radial and tangential directions. However, needless to mention, the same effect can be obtained even when the apertures in the incoming and return paths are equal either in the radial or tangential direction.

Fifth Embodiment

Figure 12:
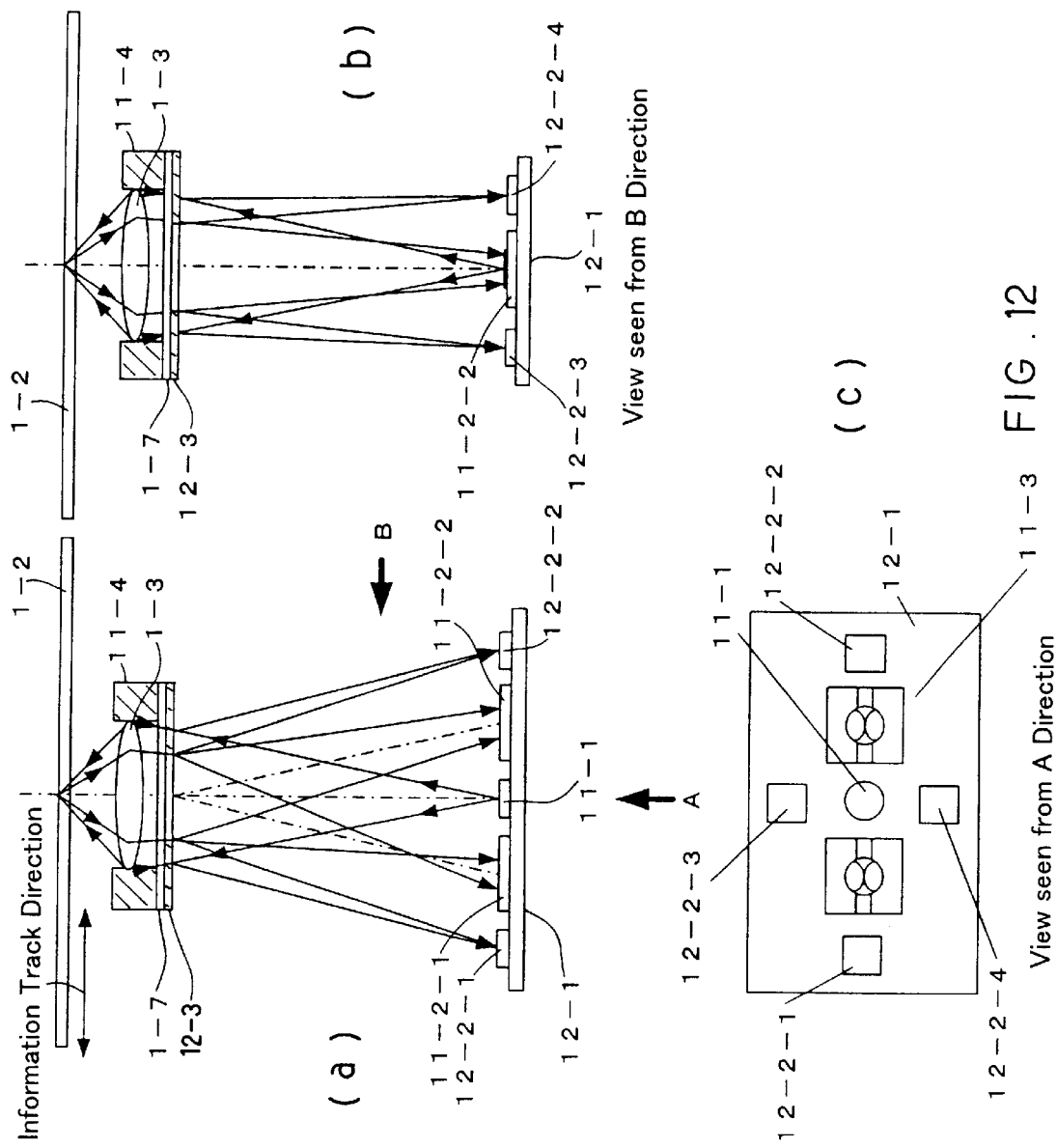
FIGS. 12(a), 12(b), and 12(c) show structural views showing an optical information processing method according to a fifth embodiment of the present invention.

A configuration according to a fifth embodiment of the present invention is described with reference to FIGS. 12(a), 12(b), and 12(c). The description of the same parts as in the fourth embodiment is omitted. In the present embodiment, four elements as second photodetectors are provided on a base 12-1. Incident light onto a grating portion of a diffraction grating 12-3 out of reflected light from an optical disk is diffracted to be led to the second photodetectors. The light led to the second photodetectors contains a lot of information about intersymbol interference in the tangential direction and information about crosstalk in the radial direction. In the configurations of the first to fourth embodiments, excellent information signals were detected by eliminating this light. In the present embodiment, information signals are obtained by calculating outputs from the first photodetectors and outputs from the second photodetectors. Even when light passing through the high NA portions in an aperture is eliminated, the intersymbol interference components and crosstalk components cannot be eliminated from the light incident onto the first photodetectors completely. By subtracting the outputs from the second photodetectors containing a lot of intersymbol interference components and crosstalk components from the outputs from the first photodetectors, the intersymbol interference components and crosstalk components contained in the outputs from the first photodetectors can be cancelled out, thus further improving information signal quality. In FIG. 12, the light passing through the high NA portions in both the tangential and radial directions is led to the second photodetectors. However, the light only in either one of the directions may be led to the second photodetectors as required. In a system affected slightly by the intersymbol interference, even in the configuration in which the light passing through the high NA portion only in the radial direction is led to the second photodetectors, information signal quality can be improved. The same is applied to the case where the light passing through the high NA portions only in the tangential direction is led to the second photodetectors.

Sixth Embodiment

Figure 13:
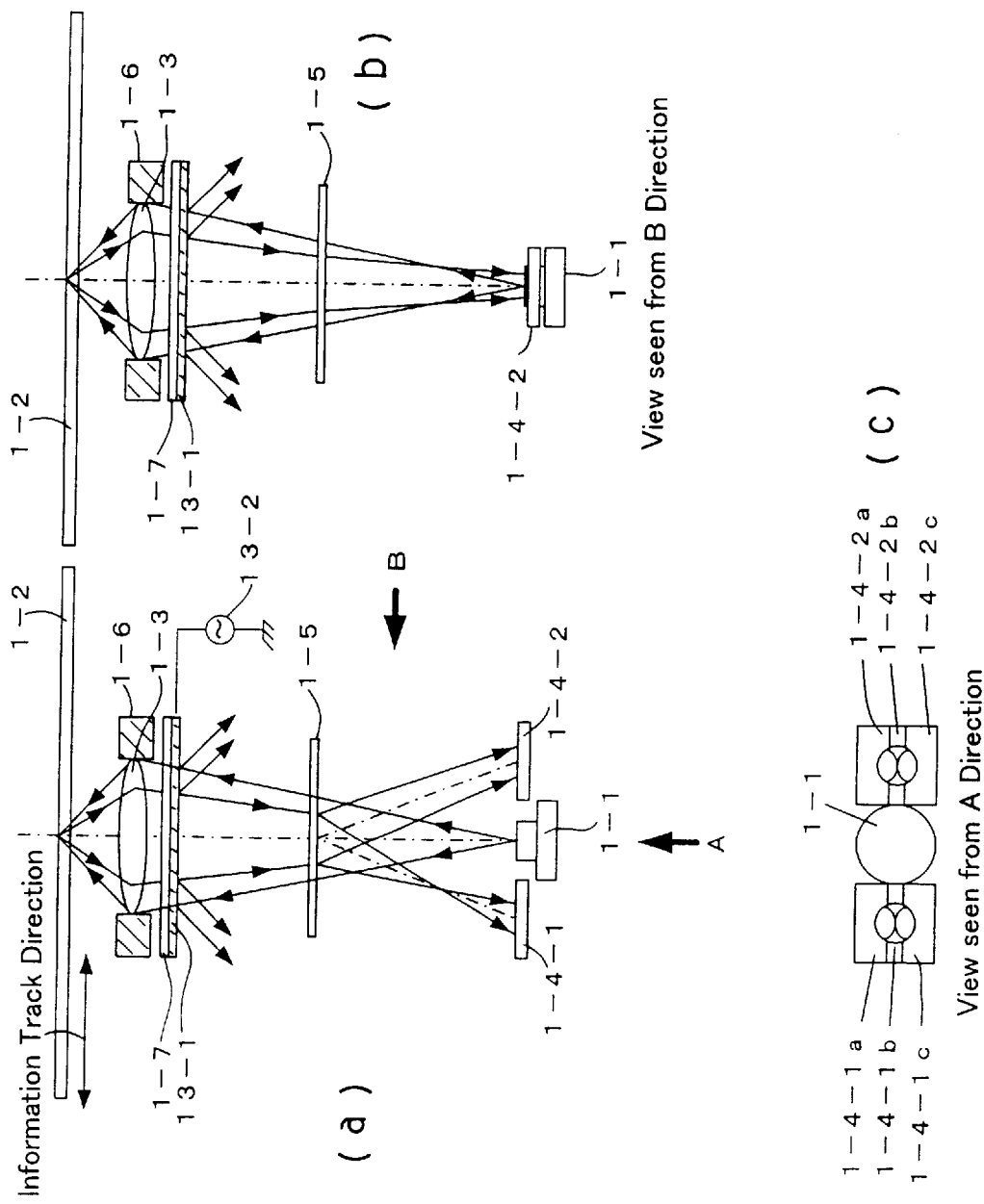
FIGS. 13(a), 13(b), and 13(c) show structural views showing an optical information processing method according to a sixth embodiment of the present invention.
Figure 14:
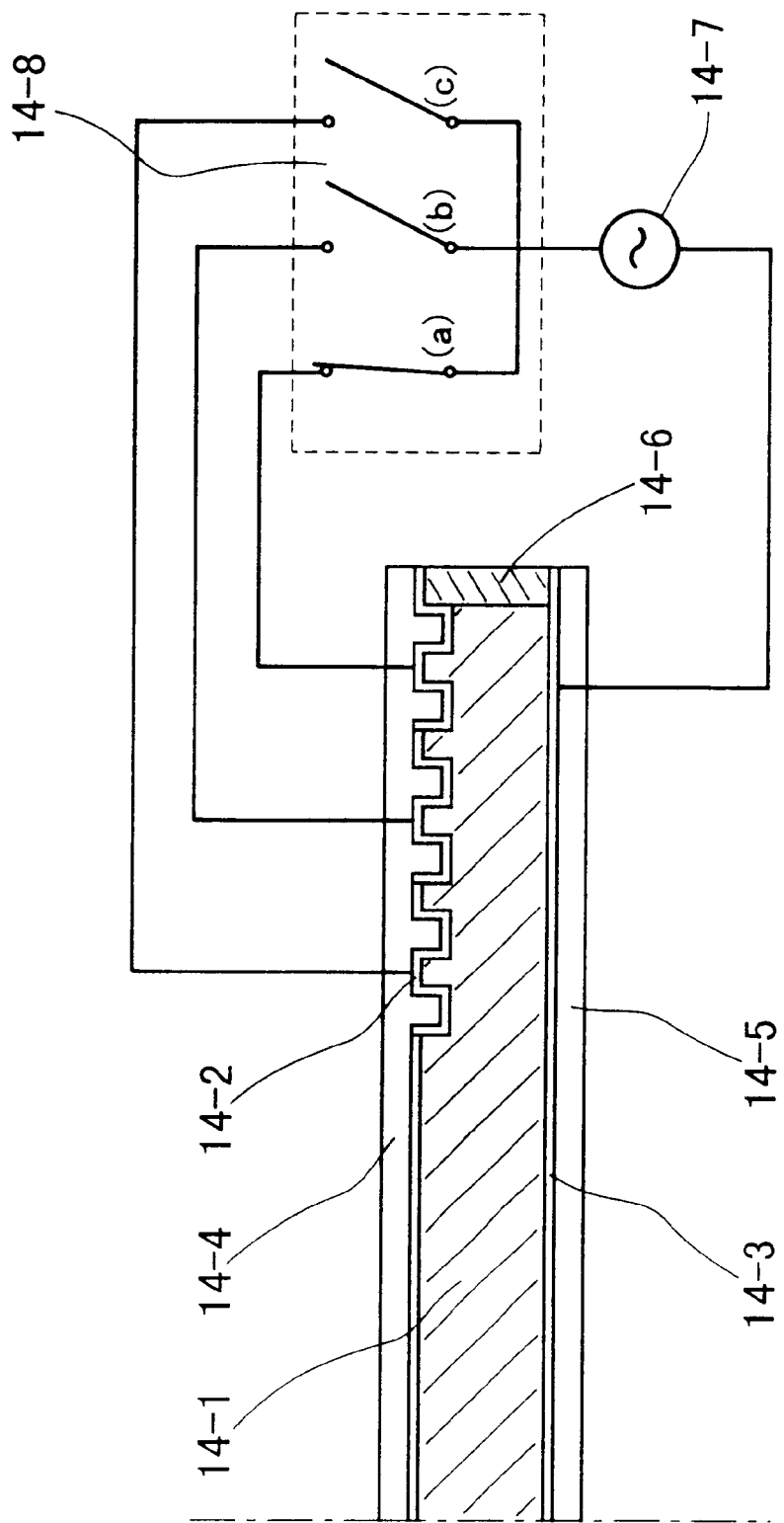
FIG. 14 is a structural example of an aperture element according to the sixth embodiment of the present invention.

A configuration according to a sixth embodiment of the present invention is described with reference to FIGS. 13(a), 13(b), and 13(c). The description of the same parts as in the first embodiment is omitted. In this embodiment of the present invention, an aperture element is formed of a $\lambda/4$ plate 1-7, a liquid crystal element 13-1, and a driving circuit 13-2 of the liquid crystal element 13-1. The liquid crystal element 13-1 functions to diffract a predetermined portion of reflected light from an optical disk outside first photodetectors as in the diffraction grating 1-8. However, in the liquid crystal element of the present embodiment, the region in which light is diffracted can be varied. FIG. 14 shows a structural example of the liquid crystal element. In FIG. 14, the portion indicated with hatching is the liquid crystal 14-1 that is sandwiched between transparent electrodes 14-2 and 14-3 in the vertical direction. The respective transparent electrodes are provided with translucent substrates 14-4 and 14-5 formed of glass or the like. A side face of the liquid crystal 14-1 is sealed with a sealing material 14-6. When voltage is applied to the upper and lower transparent electrodes by a driving circuit 14-7, portions of the liquid crystal that are sandwiched between respective periodic structure portions of the upper transparent electrode 14-2 show anisotropy corresponding to the period of the transparent electrode and thus functions as an anisotropic diffraction grating. In the present embodiment, the upper transparent electrode 14-2 is divided into three regions and is formed so that voltage can be applied to respective three regions individually by the driving circuit 14-7 through switching a switching circuit 14-8. In FIG. 14, only (a) of the switching circuit 14-8 is ON, and therefore only one region in an outer side of the transparent electrode 14-2 functions as a diffraction grating. Depending on the state of the switching circuit 14-8, the region functioning as a diffraction grating can be changed. In the present embodiment, the transparent electrode 14-2 was divided into three regions, but of course the number of regions to be divided is changed as required. Since the region functioning as a diffraction grating in an aperture element is changed by using liquid crystal to make the aperture in the return path variable, the present embodiment can provide an excellent effect in which an optimum aperture can be set according to an optical disk. When performing information recording on and information reproduction from a plurality of optical disks having different track pitches and bit pitches from one another, it also is possible to learn an optimum aperture for each optical disk automatically.

In the present embodiment, the aperture in the return path is allowed to be variable by the liquid crystal element, but of course the same can apply to the aperture in the incoming path. It also is possible to allow both the apertures in the incoming and return paths to be variable to perform recording and reproduction as required. In the present embodiment, only the configuration corresponding to the first embodiment is shown. However, the configuration is not limited to this, and the aperture elements in any configurations of the second to fifth embodiments are allowed to be variable.

Seventh Embodiment

Figure 15:
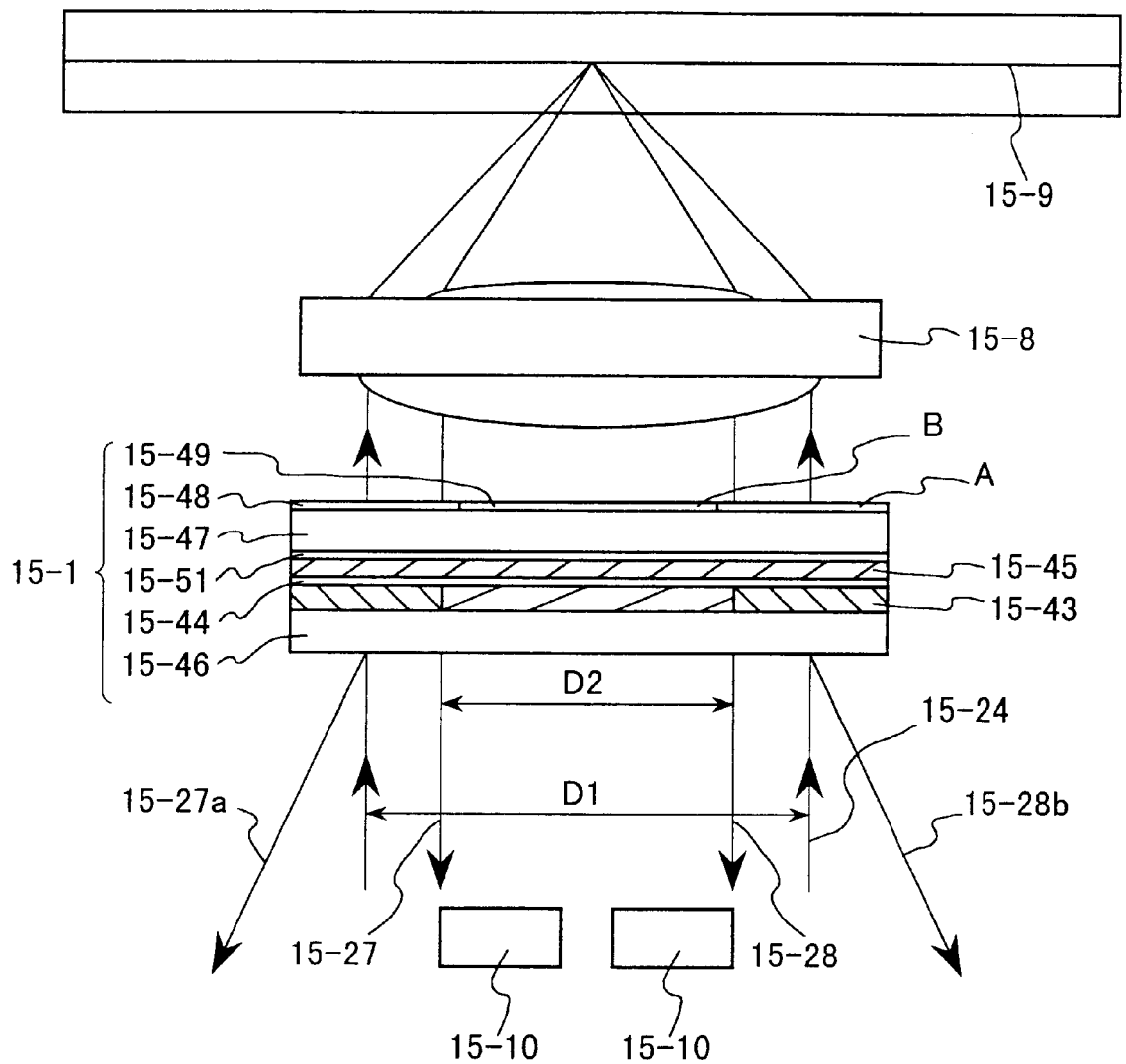
FIG. 15 is a cross-sectional structural view of an aperture element according to a seventh embodiment of the present invention.

FIG. 15 shows a cross-sectional configuration of an aperture element 15-41 according to a seventh embodiment of the present invention. In the present embodiment, an aperture element is formed of a polarization hologram formed of a 1/4 wave plate and a diffraction grating made of a birefringent material.

A film 15-45 made of birefringent resin provided adjacently to a adhesion layer 15-44 has an optical thickness corresponding to 5/4 wavelengths with respect to a beam with a wavelength $\lambda 1$ (in this case, 660 nm) with its refractive index, thickness, birefringence orientation with respect to a polarization direction being optimized. The optical thickness mentioned above corresponds to almost 1 wavelength with respect to a beam with a wavelength $\lambda 2$ (in this case, 790 nm) emitted from a light source. Therefore, with respect to the beam with the wavelength $\lambda 1$, linearly polarized light passes through the above-mentioned polarization hologram layer without being diffracted and the light that has been reflected by a reflection surface and is incident from the opposite direction is totally diffracted by the polarization hologram layer. On the other hand, with respect to the beam with the wavelength $\lambda 2$, a plane of polarization is not varied and therefore the beam is not diffracted even when passing through the element both in the incoming and return paths.

In the present embodiment, the optical thickness of the film 45 corresponds to 5/4 wavelengths with respect to the beam with a wavelength of 660 nm. However, when the wavelengths are $\lambda 1$(nm) and $\lambda 2$(nm), generally the wave plate is designed according to the following condition, $$(N1+\tfrac{1}{4})\lambda 1 \approx N2 \times 2,$$

wherein N1 and N2 represent arbitrary natural numbers.

On the other glass plate 15-47, a color separation film 15-48 that transmits the beam with the wavelength $\lambda 1$ and shields the beam with the wavelength $\lambda 2$ is formed. Furthermore, a phase adjustment film 15-49 for compensating the phase difference between lights passing through regions A and B is formed on the glass plate 15-47. Thus, the beam with the wavelength $\lambda 1$ passes through both the regions A and B, and the beam with the wavelength $\lambda 2$ passes through only the region B. In other words, the aperture is restricted.

As another embodiment, a 6/5 wave film 15-51 may be used instead of the 5/4 wave film. In this case, light that returns to the laser beam source emitting the beam with the wavelength $\lambda 1$ is caused intentionally by preventing the total diffraction of the beam with the wavelength $\lambda 1$ and thus the stability of the laser can be improved.

Figure 16:
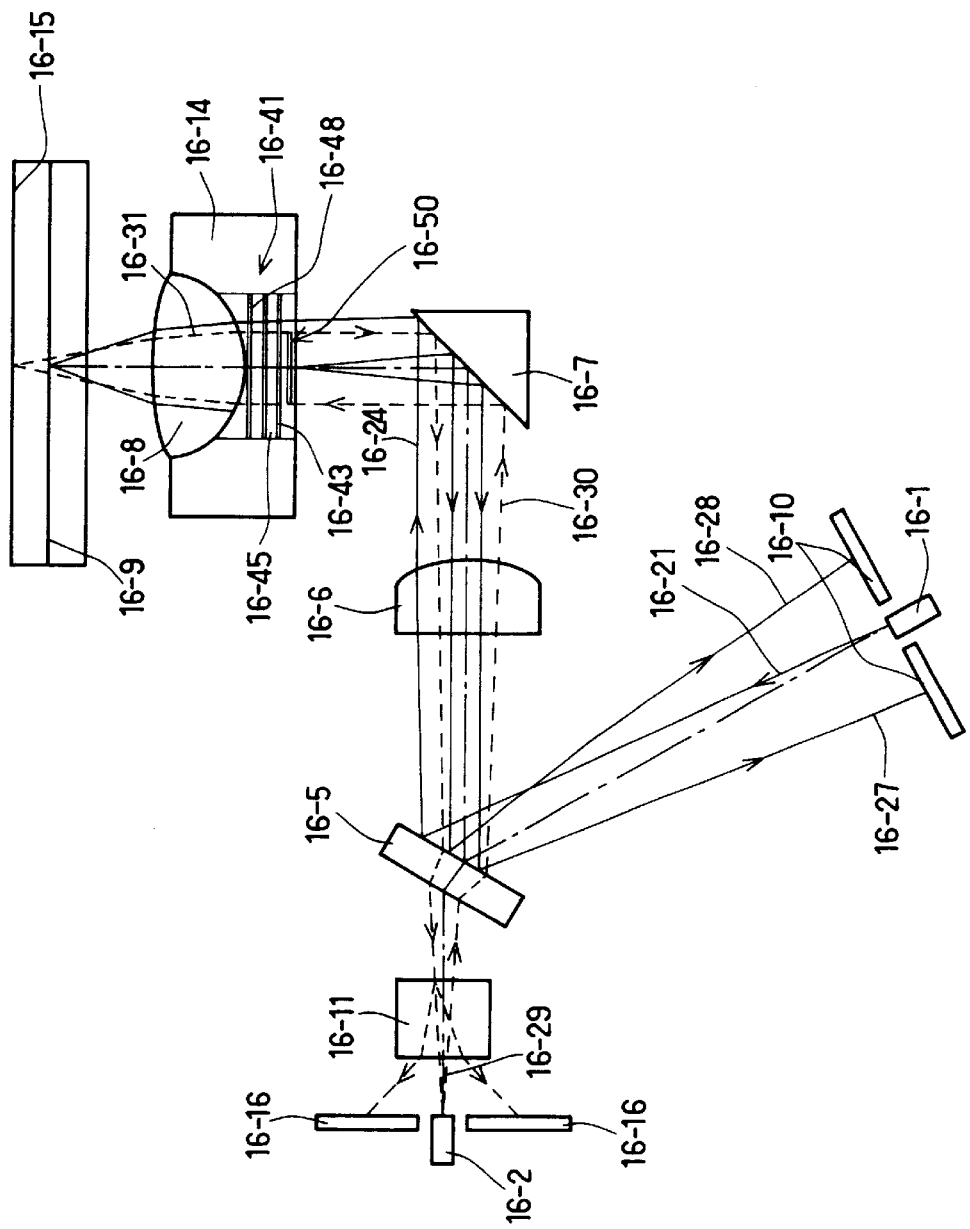
FIG. 16 shows a configuration of an optical disk device using an aperture element according to the seventh embodiment of the present invention.

FIG. 16 shows a configuration of an optical disk device using the aperture element according to the seventh embodiment of the present invention.

A laser beam 16-21 with a wavelength of 660 nm emitted from a semiconductor laser beam source 16-1 is reflected by a surface of a prism 16-5 and is collimated by a collimator lens 16-6 into parallel light 16-24. Then the parallel light 16-24 passes through an aperture element 16-41 according to the seventh embodiment of the present invention without being diffracted via a mirror 16-7 for binding an optical path and is converted from linearly polarized light into circularly polarized light via a 5/4 wave film 16-43 comprised in the aperture element 16-41. Thus, a beam with a diameter of D1 is incident onto an objective lens 16-8. The objective lens 16-8 focuses the beam with a diameter of D1, and then the focused beam is incident onto a signal surface 16-9 on a disk. When information is recorded on the signal surface, required signals are recorded on the signal surface 16-9 by increasing the power for emitting beams of the laser beam source 16-1 and applying modulation corresponding to recording signals.

Light reflected by the signal surface 16-9 travels in the opposite direction to that in the incoming path, is converted to linearly polarized light in the direction orthogonal to the incoming path, and then is incident onto a polarization hologram portion in the element 16-41. The incident light is branched into diffracted lights 16-27', 16-27a, 16-28', and 16-28b whose symmetry axis is an optical axis of the incident light, depending on its polarization dependability. Diffracted light of a beam with a diameter of D2 out of the above-mentioned diffracted lights is incident on detection surfaces on photodetectors 16-10 provided adjacently to the light source via the mirror 16-7, the collimator lens 16-6, and the prism 16-5. Thus, control signals and reproduction signals are obtained and thus reproduction is performed. The diffracted lights 16-27a and 16-28b that do not contained in the diameter D2 of the beam are not led to the photodetectors and thus are not used for reproduction signals.

When the aperture of the objective lens mentioned above is set to be $$D1 > D2,$$

wherein D1 and D2 represent an aperture of the objective lens in recording and an aperture of the objective lens in reproduction respectively, NA is proportional to the aperture in the same objective lens and therefore the relationship of $$NA1 > NA2$$

is satisfied, wherein NA1 and NA2 represent NA of the objective lens in recording and NA of the objective lens in reproduction, respectively. Consequently, NA is varied in recording and in reproduction.

In the present embodiment, the NA in recording is larger, but on the contrary, it also is easy to make the NA in reproduction larger.

A laser beam with a wavelength of 780 nm emitted from another light source 16-2 is diffracted and branched to three beams (positive first-order diffracted light, negative first-order diffracted light, and zeroth-order light) through a hologram element 16-11, which are collimated by a collimator lens into convergent light. The aperture through which the convergent light passes is limited by an aperture film 16-48 provided on a glass substrate of the aperture element 16-41 according to the seventh embodiment of the present invention via the mirror for bending an optical path, and then is incident through an objective lens onto a signal surface of each of optical disks with various substrate thicknesses. The objective lens is designed to have a shape that enables aberration to be minimum by designing apertures and optical systems optimally for respective disks having a substrate thickness of 0.6 mm with respect to a beam with a wavelength of 660 nm and a substrate thickness of 1.2 mm with respect to a beam with a wavelength of 780 nm. Light reflected from the signal surface passes through the aperture element 16-41. However, the aforementioned 5/4 wave film is set for the beam with a wavelength of 660 nm and therefore with respect to the wavelength of 780 nm, the film becomes an almost 1 wave film. Thus, the following conversion is not performed: linearly polarized light→circularly polarized light→linearly polarized light orthogonal to the incoming path. Consequently, no diffraction is caused by the polarization hologram 16-42. The light passing though the element is incident onto the hologram 16-11 via the mirror 16-7, the collimator lens 16-6, and the prism 16-5, is diffracted by the hologram 16-11 and then is incident onto detection surfaces of the photodetectors 16-16.

Eighth Embodiment

Figure 17:
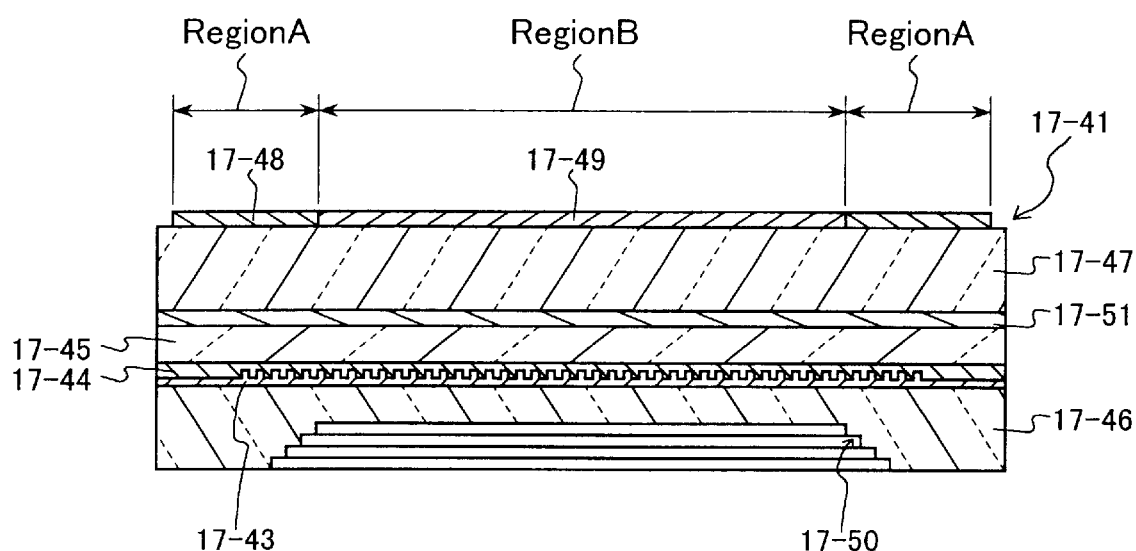
FIG. 17 is a cross-sectional structural view of an aperture element according to an eighth embodiment of the present invention.

FIG. 17 shows a cross-sectional configuration of an aperture element 17-41 according to an eighth embodiment of the present invention.

The element is formed by sandwiching a polarization hologram layer and a wave film between two glass substrates. On the glass substrate 17-46, a concave-convex structure 17-43 is formed of a birefringent material (with refractive indexes of n1, n2) such as liquid crystal, and an isotropic adhesion layer (with a refractive index of n1) 17-44 is provided thereon. A film 17-45 made of birefringent resin that is provided adjacently to the adhesion layer 17-44 has an optical thickness corresponding to 5/4 wavelengths with respect to a beam with a wavelength $\lambda 1$ (for example, 660 nm) with its refractive index, thickness, birefringence orientation with respect to a polarization direction being optimized. The optical thickness mentioned above corresponds to almost 1 wavelength with respect to a beam with a wavelength $\lambda 2$ (for example, 790 nm) emitted from a light source. Therefore, linearly polarized light passes through the above-mentioned polarization hologram layer without being diffracted only with respect to the beam with the wavelength $\lambda 1$, and the light that has been reflected by a reflection surface and is incident from the opposite direction is totally diffracted by the polarization hologram layer. On the other hand, with respect to the beam with the wavelength $\lambda 2$, a plane of polarization is not varied and therefore the beam with the wavelength $\lambda 2$ is not diffracted even when passing through the element both in the incoming and return paths. Generally, this effect can be obtained when wavelengths $\lambda 1$ and $\lambda 2$ of the two kinds of beams passing through the element satisfy the relationship of $(N1+1/4)\lambda 1 \approx N2 \times \lambda 2$ (wherein N1, N2=1, 2, 3 . . . ).

On the other glass plate 17-47, a color separation film 17-48 that transmits the beam with the wavelength $\lambda 1$ and shields the beam with the wavelength $\lambda 2$ is formed. Furthermore, a phase adjustment film 17-49 for compensating the phase difference between lights passing through regions A and B is formed on the glass plate 17-47. Thus, the beam with the wavelength $\lambda 1$ passes through both the regions A and B, and the beam with the wavelength $\lambda 2$ passes through only the region B. In other words, the aperture is restricted. Furthermore, on the opposite surface to the surface of the glass plate 17-46 on which a diffraction grating is formed, a concentric stepped structure 17-50 has been formed beforehand and has a function of compensating chromatic aberration caused by shift in wavelength of a beam emitted form a laser beam source 1 as described in the conventional example. In addition, since the beam with the other wavelength $\lambda 2$ is originally of almost spherical wave, the optical system is required to be set so as to compensate the spherical wave.

The element 17-41 is formed by sandwiching the wave film 17-45 and the diffraction grating portion 17-43 between these glass substrates 17-46 and 17-47 via the adhesion layers 17-44 and 17-51. In this case, since the element can be formed in wafer unit in a manner of mask alignment in a semiconductor process, the relative position of the centers of an aperture limitation film 17-48, a diffraction grating 17-43, and the concentric stepped configuration 17-50 is not shifted. In addition, good mass-productiveness is obtained.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information processor performing at least one of information recording and information reproduction with respect to an information recording medium, comprising:

a light source;

an objective lens for focusing light emitted from the light source on the information recording medium;

a separation element for separating light reflected from the information recording medium and traveling toward the light source; and first photodetectors for receiving light separated by the separation element, wherein an aperture NA1 for light in an incoming path traveling from the light source toward the information recording medium and an aperture NA2 for light in a return path reflected from the information recording medium and traveling toward the first photodetectors are formed so as to satisfy a relationship of NA1>NA2.

2. The optical information processor according to claim 1, wherein the aperture NA1 for light in the incoming path and the aperture NA2 for light in the return path satisfy a relationship of 1<NA/NA2<1.2.

3. The optical information processor according to claims 1, wherein the aperture NA1 for light in the incoming path is formed in a circular shape.

4. The optical information processor according to claim 1, wherein the aperture for light in the return path is formed of an aperture element comprising a diffraction grating and a $\lambda/4$ plate.

5. The optical information processor according to claim 1, wherein the separation element is formed of a hologram.

6. The optical information processor according to claim 1, wherein the aperture for light in the return path is formed of an aperture element provided with a diffraction grating, the separation element is formed of a hologram, and the aperture element and the separation element are combined to form one component.

7. The optical information processor according to claim 1, wherein the light source and the first photodetectors are combined to form one component.

8. The optical information processor according to claim 1, wherein the objective lens and the aperture element are combined to form one component.

9. The optical information processor according to claim 1, wherein the aperture for light in the return path is formed to be variable.

\* \* \* \* \*

UNITED STATES PATENT AND TRADEMARK OFFICE
CERTIFICATE OF CORRECTION

PATENT NO. : 6,618,343 B1
DATED : September 9, 2003
INVENTOR(S) : Youichi Saitoh et al.

It is certified that error appears in the above-identified patent and that said Letters Patent is hereby corrected as shown below:

<u>Column 18,</u>
Line 6, replace "1<NA/NA2<1.2" with -- 1<NA1/NA2<1.2 --.
Line 7, replace "claims" with -- claim --.

Signed and Sealed this

Twenty-fourth Day of February, 2004

JON W. DUDAS
*Acting Director of the United States Patent and Trademark Office*